United States Patent
Kim et al.

(10) Patent No.: US 8,776,154 B2
(45) Date of Patent: Jul. 8, 2014

(54) METHOD FOR SHARING MESSAGES IN IMAGE DISPLAY AND IMAGE DISPLAY DEVICE FOR THE SAME

(75) Inventors: Sangjeon Kim, Pyeongtaek-si (KR); Hanbitt Joo, Pyeongtaek-si (KR); Seonghwan Ryu, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/277,014

(22) Filed: Oct. 19, 2011

(65) Prior Publication Data

US 2012/0144423 A1 Jun. 7, 2012

Related U.S. Application Data

(60) Provisional application No. 61/419,259, filed on Dec. 3, 2010.

(30) Foreign Application Priority Data

Dec. 27, 2010 (KR) .................. 10-2010-0135297

(51) Int. Cl.
| | |
|---|---|
| *G06F 3/00* | (2006.01) |
| *H04N 21/462* | (2011.01) |
| *H04L 12/58* | (2006.01) |
| *H04L 29/04* | (2006.01) |
| *H04L 29/08* | (2006.01) |

(52) U.S. Cl.
CPC ............ *H04N 21/4622* (2013.01); *H04L 51/00* (2013.01); *H04L 29/04* (2013.01); *H04L 29/0809* (2013.01)
USPC .............. 725/109; 725/40; 715/758; 709/217

(58) Field of Classification Search
CPC .... H04N 21/4622; H04L 51/00; H04L 29/04; H04L 29/0809
USPC .............................................. 725/39
See application file for complete search history.

(56) References Cited

U.S. PATENT DOCUMENTS

| | | | | |
|---|---|---|---|---|
| 7,945,952 | B1 * | 5/2011 | Behforooz | 726/22 |
| 8,307,395 | B2 * | 11/2012 | Issa et al. | 725/46 |
| 8,448,206 | B2 * | 5/2013 | Roberts et al. | 725/40 |
| 8,499,048 | B2 * | 7/2013 | Malik et al. | 709/206 |
| 8,566,876 | B2 * | 10/2013 | Morris et al. | 725/46 |
| 8,589,975 | B2 * | 11/2013 | Mckissick et al. | 725/37 |
| 2004/0244035 | A1 * | 12/2004 | Wright et al. | 725/32 |

(Continued)

FOREIGN PATENT DOCUMENTS

| | | |
|---|---|---|
| WO | WO2006-074305 | 7/2006 |
| WO | WO2010-068345 | 6/2010 |

OTHER PUBLICATIONS

International Search Report dated Apr. 19, 2012.

*Primary Examiner* — Nasser Goodarzi
*Assistant Examiner* — Michael B Pierorazio
(74) *Attorney, Agent, or Firm* — KED & Associates LLP

(57) ABSTRACT

A method for controlling display of information includes displaying content on a first display device, receiving a signal to share information, generating a message including information corresponding to the displayed content, and transmitting the message for display on at least a second display device. The message is transmitted to a provider of a network-related service, and the first and second display devices have access to the network-related service which may be but is not limited to a social network service.

7 Claims, 36 Drawing Sheets

(56) References Cited

U.S. PATENT DOCUMENTS

| | | | |
|---|---|---|---|
| 2005/0262542 A1* | 11/2005 | DeWeese et al. | 725/106 |
| 2007/0169165 A1* | 7/2007 | Crull et al. | 725/135 |
| 2008/0091535 A1* | 4/2008 | Heiser et al. | 705/14 |
| 2008/0134052 A1* | 6/2008 | Davis et al. | 715/744 |
| 2008/0189740 A1* | 8/2008 | Carpenter et al. | 725/38 |
| 2008/0196060 A1* | 8/2008 | Varghese | 725/34 |
| 2008/0244413 A1* | 10/2008 | Sampson et al. | 715/738 |
| 2009/0158176 A1* | 6/2009 | Kalaboukis et al. | 715/758 |
| 2009/0164914 A1* | 6/2009 | Chen | 715/753 |
| 2009/0288110 A1* | 11/2009 | Logan et al. | 725/24 |
| 2009/0299843 A1* | 12/2009 | Shkedi | 705/14.25 |
| 2010/0131385 A1* | 5/2010 | Harrang et al. | 705/26 |
| 2010/0242074 A1* | 9/2010 | Rouse et al. | 725/100 |
| 2010/0250672 A1* | 9/2010 | Vance et al. | 709/204 |
| 2010/0269144 A1* | 10/2010 | Forsman et al. | 725/92 |
| 2010/0332570 A1* | 12/2010 | Roberts et al. | 707/912 |
| 2011/0047487 A1* | 2/2011 | Deweese et al. | 715/758 |
| 2011/0078724 A1* | 3/2011 | Mehta et al. | 725/32 |
| 2011/0107382 A1* | 5/2011 | Morris et al. | 725/109 |
| 2011/0197224 A1* | 8/2011 | Meijer | 725/34 |
| 2011/0276383 A1* | 11/2011 | Heiser et al. | 705/14.25 |
| 2011/0283189 A1* | 11/2011 | Mccarty | 715/707 |
| 2012/0072956 A1* | 3/2012 | Thomas et al. | 725/88 |
| 2012/0174157 A1* | 7/2012 | Stinson et al. | 725/40 |
| 2013/0013736 A1* | 1/2013 | Kennedy | 709/217 |
| 2013/0332957 A1* | 12/2013 | DeWeese et al. | 725/37 |

* cited by examiner

FIG. 18
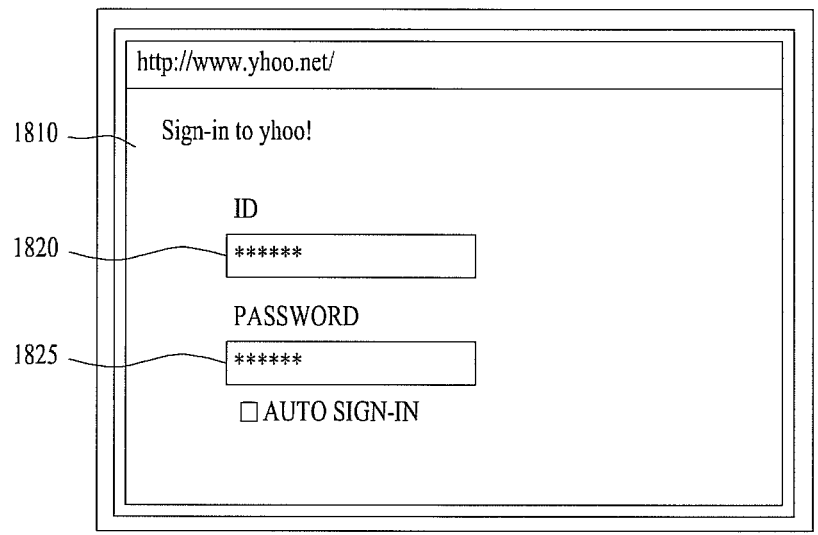
(a)
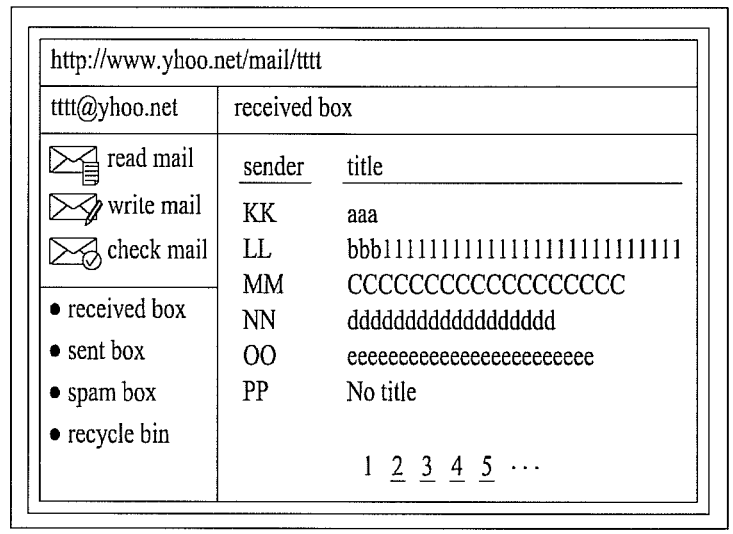
(b)

FIG. 23
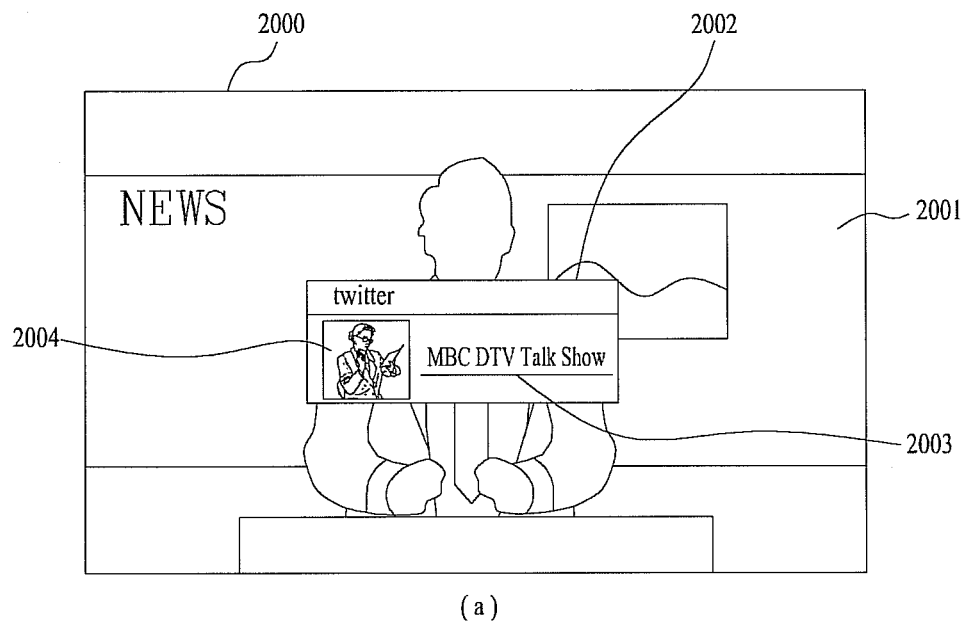
(a)
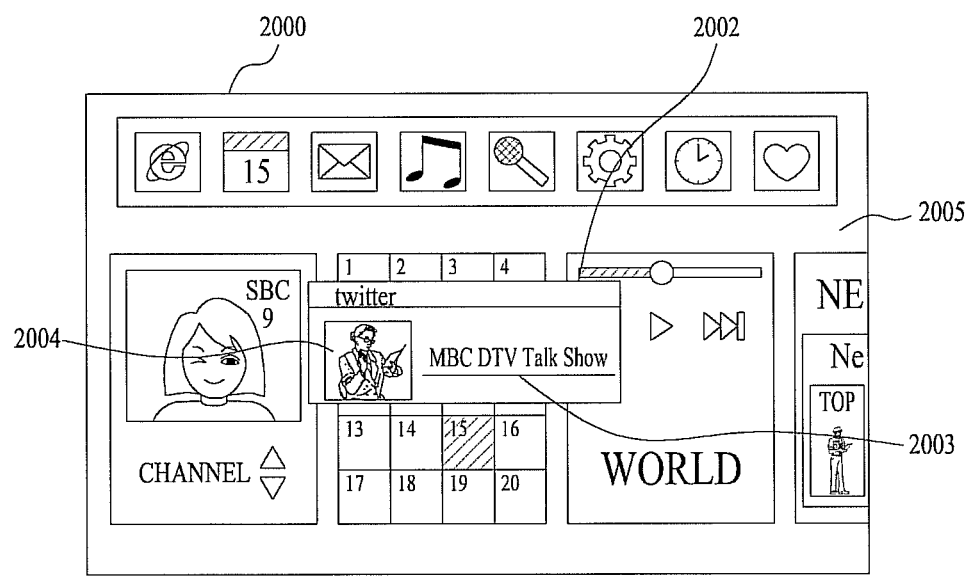
(b)

Program Guide — 3302

| Sat, Aug 26 | 8:00 PM | | 9:00 PM |
|---|---|---|---|
| 1 WBCC | Tles that Blnd | | The Monther Road (New) |
| 2 WMFE | Keeping Up Appearanc | Keeping Up Appearanc | Are You Being Served? The Club |
| 3 WOFL | Cops (repeat) | Cops (repeat) | America's Most Wanted |
| 4 WESH | Dateline NBC (New) | | Law and Order Criminal Intent (New) |
| 5 WKMC | NFL Pre-Season Football "Tampa Bay@Jacksoneville" | | |
| 6 WRBW | Rushmore | | |

3301

Dateline NBC
(New)
08:00 - 09:00 4 WESH

3303

METHOD FOR SHARING MESSAGES IN IMAGE DISPLAY AND IMAGE DISPLAY DEVICE FOR THE SAME

CROSS-REFERENCE TO RELATED APPLICATIONS

This application claims the benefit of the U.S. Provisional patent application No. 61/419,259 filed on Dec. 3, 2010 and Korean Patent Application No. 10-2010-0135297 filed on Dec. 27, 2010 which are hereby incorporated by reference as if fully set forth herein.

BACKGROUND

1. Field

One or more embodiments described herein relate to controlling the display of information.

2. Background

Televisions, monitors, and other types of image display devices receive various types of content including internet-based information and broadcast images. However, none of these devices provide a way of exchanging information corresponding to displayed webpages, TV programming, games or other content through use of a network service such as but not limited to social network service.

BRIEF DESCRIPTION OF THE DRAWINGS

FIG. 18 shows a fourth embodiment of a UI for an image display device.

FIG. 23 shows one embodiment of a display screen that includes an Input Message window.

FIG. 35 shows an example of an electronic program guide (EPG).

DETAILED DESCRIPTION

Figure 1:
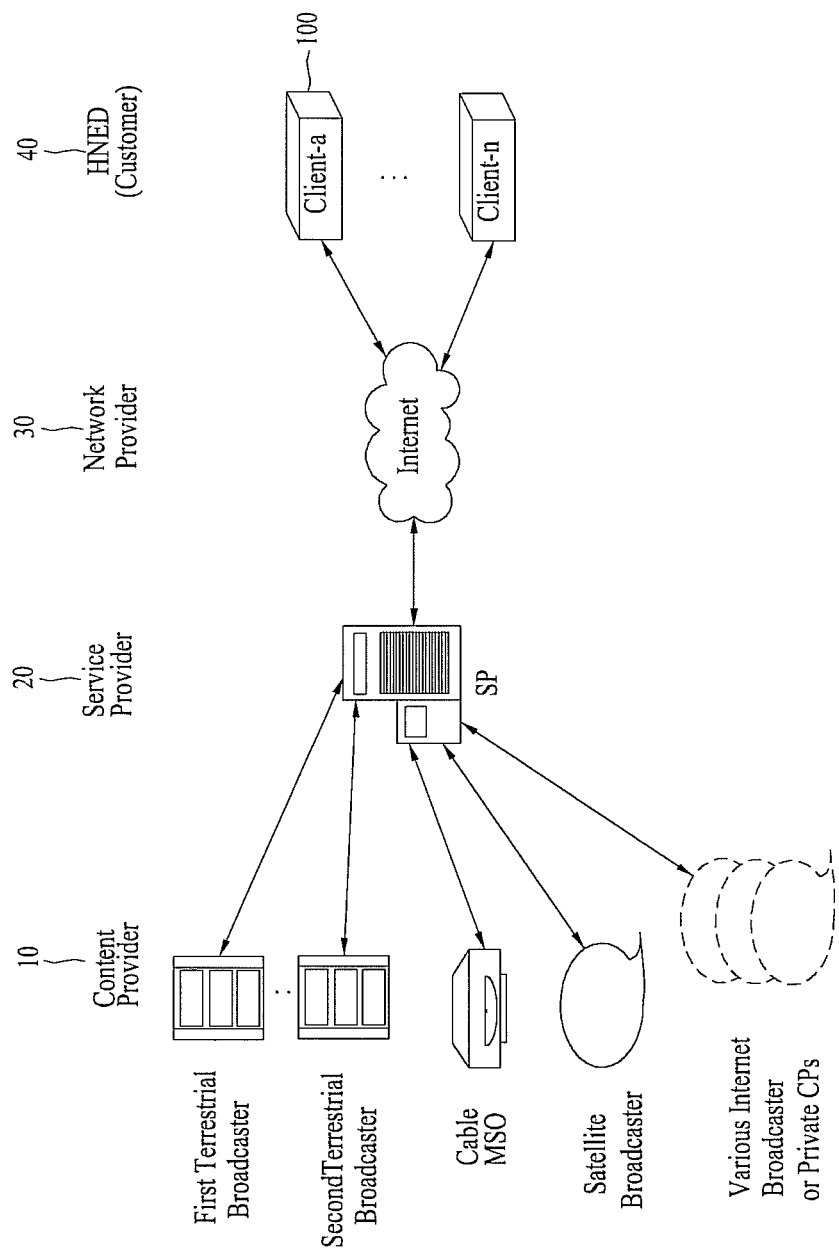
FIG. 1 shows a broadcast system with an image display device.

FIG. 1 illustrates the overall configuration of a broadcast system including an image display device according to an embodiment. As shown in FIG. 1, the broadcast system including the image display device according to one embodiment may include a Content Provider (CP) 10, a Service Provider (SP) 20, a Network Provider (NP) 30, and a Home Network End Device (HNED) 40. The HNED 40 corresponds to, for example, a client 100 which is an image display device according to an embodiment. The client 100 corresponds to the image display device according to one embodiment, and the image display device may be a network TV, a smart TV, an Internet Protocol TV (IPTV), etc.

The CP 10 creates and provides a variety of content. The CP 10 may be, for example, a terrestrial broadcaster, a cable System Operator (SO) or Multiple System Operator (MSO), a satellite broadcaster, or an Internet broadcaster, as shown in FIG. 1. Besides broadcast content, the CP 10 may provide various applications, which will be described later in detail.

The SP 20 may provide content received from the CP 10 as a service package. For instance, the SP 20 may package first terrestrial broadcasts, second terrestrial broadcasts, cable MSOs, satellite broadcasts, various Internet broadcasts, and applications and provide the package to users.

The SP 20 may unicast or multicast a service to the client 100. Unicast is a form of transmission in which data is sent from only one transmitter to only one receiver. In an example of unicast transmission, upon receipt of a request for data from a receiver, a server transmits the data to only one receiver. Multicast is a type of transmission or communication in which a transmitter transmits data to a group of receivers. For example, a server may transmit data to a plurality of pre-registered receivers at one time. For multicast registration, the Internet Group Management Protocol (IGMP) may be used.

The NP 30 may provide a network over which a service is provided to the client 100. The client 100 may construct a home network end user (HNED) and receive a service over the HNED.

Content transmitted in the above-described system including the image display device may be protected through conditional access or content protection. CableCard and Downloadable Conditional Access System (DCAS) are examples of such conditional access or content protection systems.

The client 100 may also transmit content over a network. In this case, the client 100 serves as a CP and thus the CP 10 may receive content from the client 100. Therefore, an interactive content service or data service can be provided.

Figure 2:
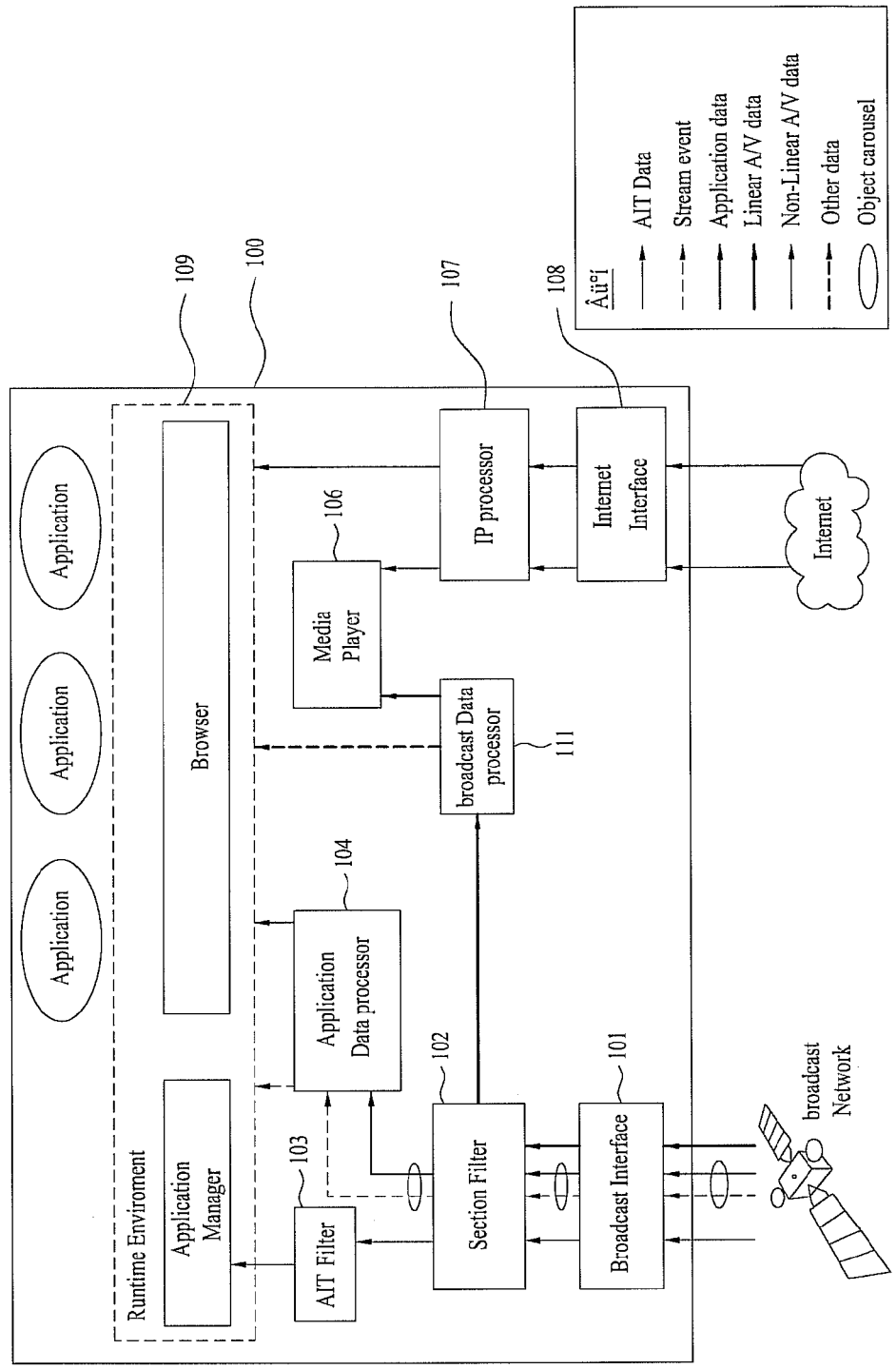
FIG. 2 shows another broadcast system with an image display device.

FIG. 2 illustrates the overall configuration of a broadcast system including an image display device according to another embodiment.

As shown in FIG. 2, the image display device 100 according to another embodiment is connected to a broadcast network and the Internet. The image display device 100 is, for example, a network TV, a smart TV, an HBBTV, etc.

The image display device 100 includes, for example, a broadcast interface 101, a section filter 102, an Application Information Table (AIT) filter 103, an application data processor 104, a broadcast data processor 111, a media player 106, an Internet Protocol (IP) processor 107, an Internet interface 108, and a runtime module 109.

The image display device 100 receives AIT data, real-time broadcast content, application data, and stream events through the broadcast interface 101. The real-time broadcast content may be referred to as linear Audio/Video (A/V) content.

The section filter 102 performs section filtering on the four types of data received through the broadcast interface 101, and outputs the AIT data to the AIT filter 103, the linear A/V content to the broadcast data processor 111, and the stream events and application data to the application data processor 104.

Meanwhile, the image display device 100 receives non-linear A/V content and application data through the Internet interface 108. The non-linear A/V content may be, for example, a Content On Demand (CoD) application.

The non-linear A/V content and the application data are transmitted to the media player 106 and the runtime module 109, respectively.

The runtime module 109 includes, for example, an application manager and a browser as illustrated in FIG. 2. The application manager controls the life cycle of an interactive application using the AIT data, for example. The browser displays and processes the interactive application.

The game application according to one embodiment is received through the broadcast interface 101 or the Internet interface 108 shown in FIG. 2.

The game application received through the broadcast interface 101 is transmitted to the runtime module 109 through the application data processor 104. The game application received through the Internet interface 108 is transmitted to the runtime module 109 through the IP processor 107.

Figure 3:
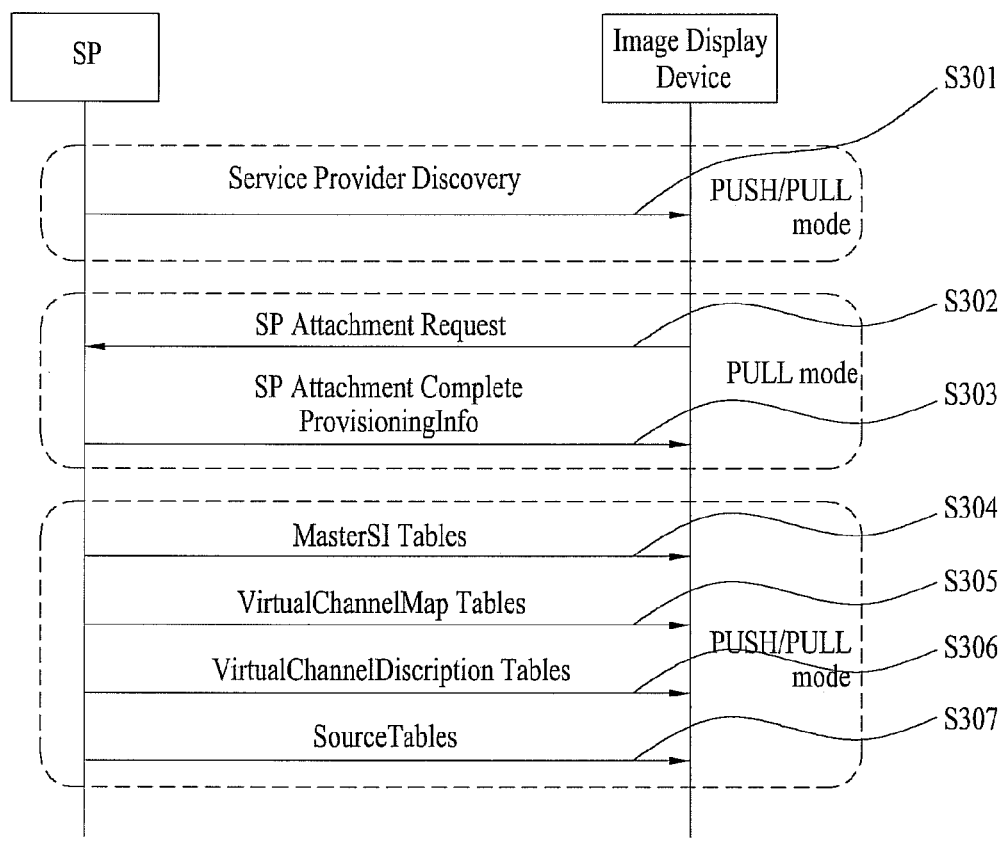
FIG. 3 shows one way in which the image display device in FIG. 1 or 2 may access a service provider and receives channel and/or other information.

The runtime module 109 executes the game application. FIG. 3 is a diagram showing steps in which the image display device shown in FIG. 1 or 2 accesses an SP and receives channel information, etc. FIG. 3 is purely exemplary and the method shown in FIG. 3 does not limit the scope.

The SP performs an SP discovery operation (S301). The image display device transmits an SP attachment request signal (S302). Upon completion of attachment to the SP, the image display device receives provisioning information from the SP (S303). Further, the image display device receives Master System Information (SI) Tables (S304), receives Virtual Channel Map Tables (S305), receives Virtual Channel Description Tables (S306), and receives Source Tables from the SP (S307).

More specifically, SP Discovery is a process by which SPs that provide IPTV services search for servers providing services to the SPs.

In order to receive information (e.g., SP discovery information) about the service discovery (SD) servers, an SD server address list can be detected, for example, using three methods, specifically use of an address preset in the image display device or an address manually set by a user, Dynamic Host Configuration Protocol (DHCP)-based SP Discovery, and Domain Name System Service (DNS SRV)-based SP Discovery. The image display device accesses a specific SD server using the SD server address list obtained through one of the above three methods and receives an SP Discovery record from the specific SD server. The Service Provider Discovery record includes information needed to perform Service Discovery on an SP basis. The image display device then starts a Service Discovery operation using the SP Discovery record. These operations can be performed in a push mode or a pull mode.

The image display device accesses an SP attachment server specified by an SP attachment locator included in the SP Discovery record and performs a registration procedure (or a service attachment procedure).

Further, after accessing an authentication service server of an SP specified by an SP authentication locator and performing an authentication procedure, the image display device may perform a service authentication procedure.

Once service attachment is successfully completed, a server may transmit data to the image display device in the form of a provision info nation table.

During service attachment, the image display device may include an Identifier (ID) and location information thereof in data and transmit the data to the service attachment server. Thus the service attachment server may specify a service that the image display device has subscribed to based on the ID and location information. In addition, the service attachment server provides, in the form of a provisioning information table, address information from which the image display device can obtain Service Information (SI). The address information corresponds to access information about a Master SI Table. This method facilitates provision of a customized service to each subscriber.

The SI is divided into a Master SI Table record for managing access information and version information about a Virtual Channel Map, a Virtual Channel Map Table for providing a list of services in the form of a package, a Virtual Channel Description Table that contains details of each channel, and a Source Table that contains access information about actual services. The image display device shown in FIG. 3 receives the game application according to one embodiment from the SP or a virtual channel provided by a broadcast station.

Figure 4:
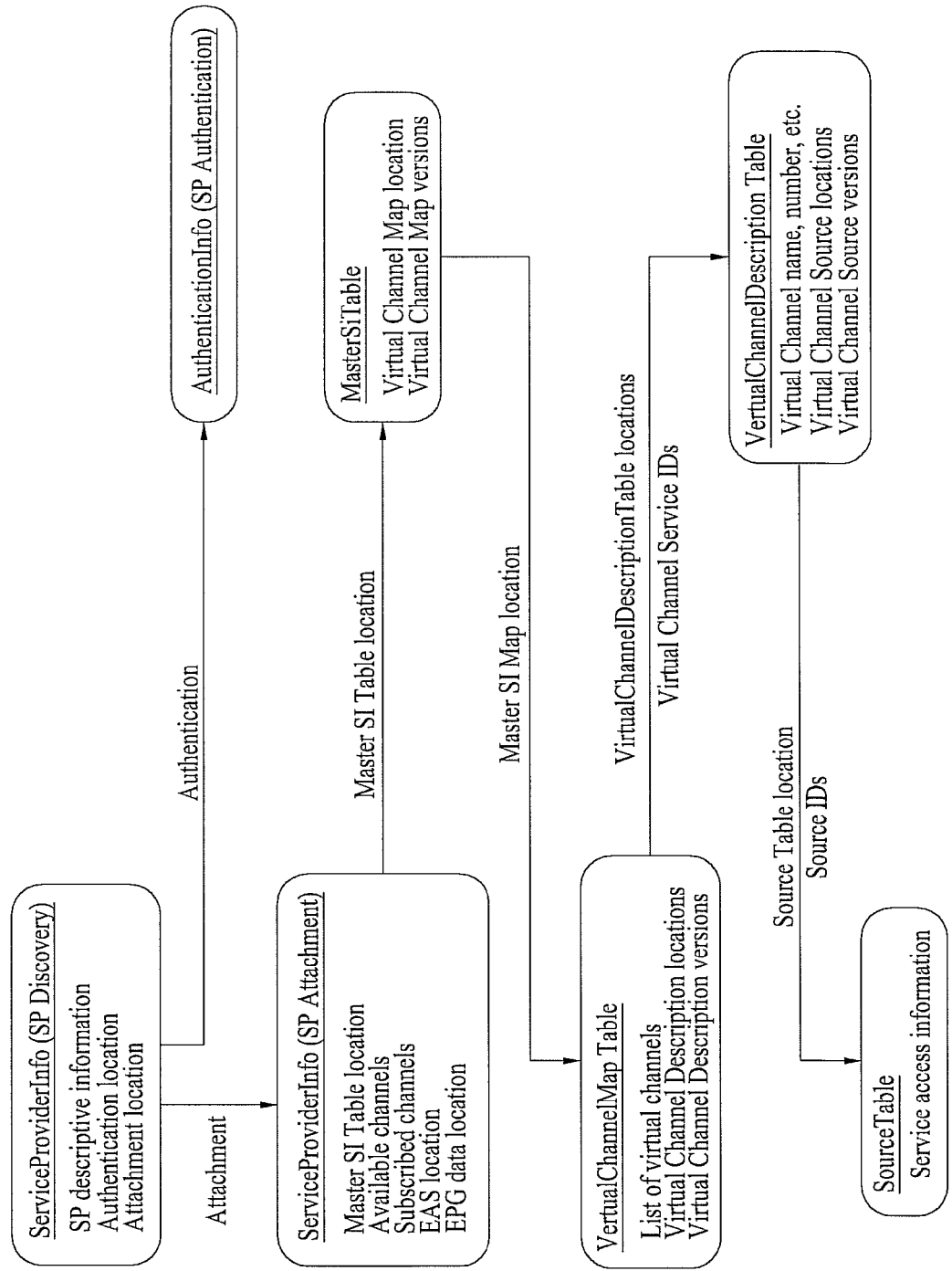
FIG. 4 shows an example of data that may be used in FIG. 3.

FIG. 4 is a diagram showing an example of data used in the steps shown in FIG. 3. FIG. 4 is a detailed diagram of FIG. 3, illustrating a relationship among data in the SI.

A Master SI Table contains information about the location and version of each Virtual Channel MAP.

Each Virtual Channel MAP is identified by its Virtual Channel MAP identifier. Virtual Channel MAP Version specifies the version number of the Virtual Channel MAP. If any of the tables connected to the Master SI Table shown in FIG. 4 in the arrowed direction is modified, the versions of the modified table and overlying tables thereof (up to the Master SI Table) are incremented. Accordingly, a change in any of the SI tables can be readily identified by monitoring the Master SI Table.

For example, when the Source Table is changed, the version of the Source Table is incremented and the version of the Virtual Channel Description Table that references the Source Table is also incremented. In conclusion, a change in any lower table leads to a change in its higher tables and, eventually, a change in the Master SI Table.

One Master SI Table may exist for each SP. However, in the case where service configurations differ for regions or subscribers (or subscriber groups), an SP may have a plurality of Master SI Tables in order to provide a customized service on a unit basis. Thus it is possible to efficiently provide a customized service to a subscriber through the master SI table according to a region in which the subscriber is located and subscriber information regarding the subscriber.

A Virtual Channel Map Table may contain one or more virtual channels. A Virtual Channel Map includes not only details of the channels but information about the locations of the details of the channels. In the Virtual Channel Map Table, Virtual Channel Description Location specifies the location of a Virtual Channel Description Table including the details of the channels.

The Virtual Channel Description Table contains the details of the virtual channels. The Virtual Channel Description Table can be accessed using the Virtual Channel Description Location of the Virtual Channel Map Table.

A Source Table provides information necessary to access actual services (e.g. IP addresses, ports, AV Codecs, transmission protocols, etc.) on a service basis.

The above-described Master SI Table, the Virtual Channel Map Table, the Virtual Channel Description Table and the Source Table are delivered in four logically separate flows, in a push mode or a pull mode. For version management, the Master SI Table may be multicast and thus version changes can be monitored by receiving a multicast stream.

Figure 5:
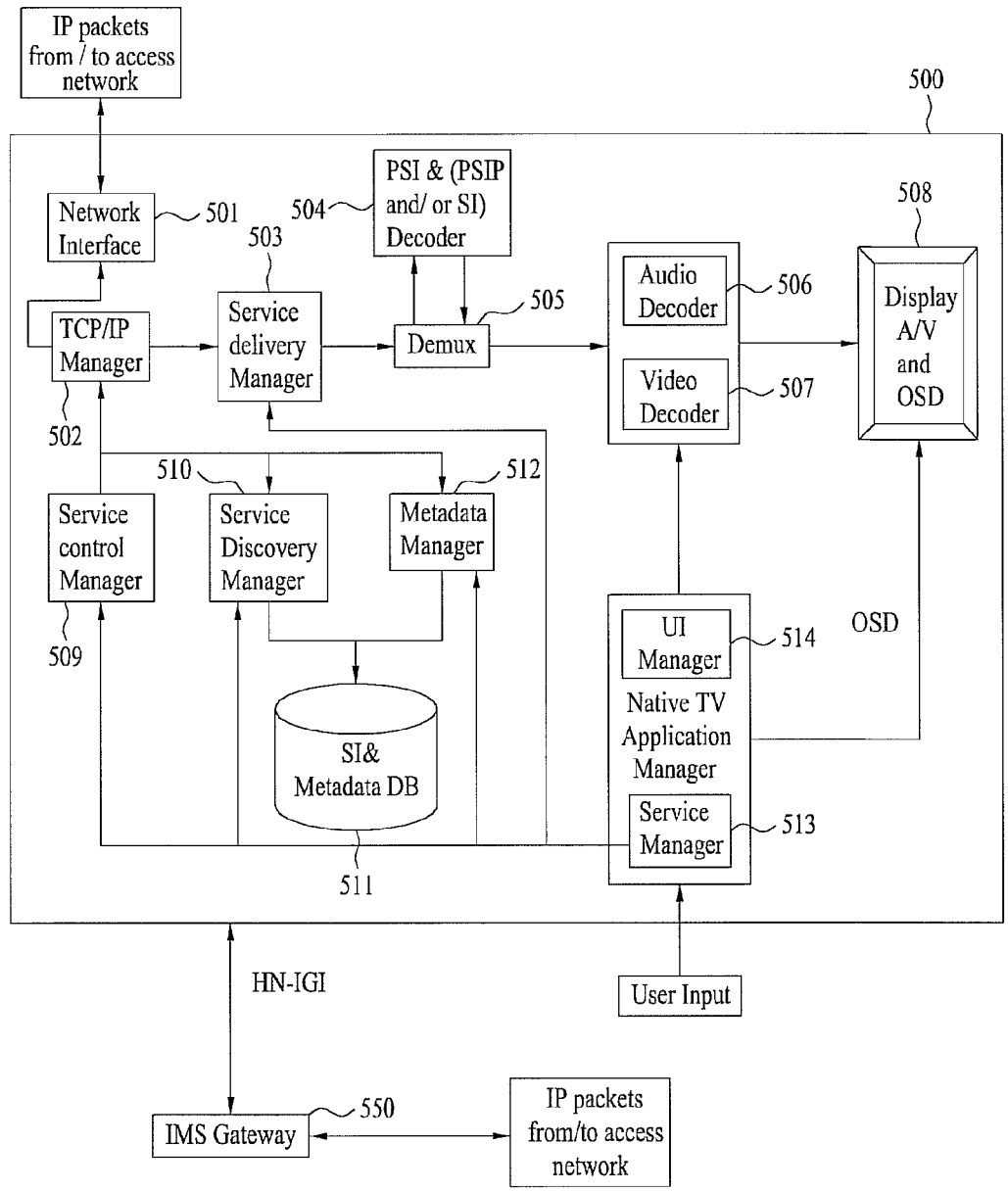
FIG. 5 shows an example of the image display device in FIG. 1 or 2.

FIG. 5 is a detailed block diagram of the image display device shown in FIG. 1 or 2 according to an embodiment. The structure of the image display device in FIG. 5 is purely exemplary and should not be interpreted as limiting the scope.

An image display device 500 includes a network interface 501, a Transmission Control Protocol/Internet Protocol (TCP/IP) manager 502, a service delivery manager 503, a demultiplexer (DEMUX) 505, a Program Specific Information (PSI) & (Program and System Information Protocol (PSIP) and/or SI) decoder 504, an audio decoder 506, a video decoder 507, a display A/V and OSD module 508, a service control manager 509, a service discovery manager 510, a metadata manager 512, an SI & metadata database (DB) 511, a User Interface (UI) manager 514, and a service manager 513.

The network interface 501 transmits packets to and receives packets from a network. Specifically, the network interface 501 receives services and content from an SP over the network.

The TCP/IP manager 502 is involved in packet reception and transmission of the image display device 500, that is, packet delivery from a source to a destination. The TCP/IP manager 502 classifies received packets according to appropriate protocols and outputs the classified packets to the service delivery manager 505, the service discovery manager 510, the service control manager 509, and the metadata manager 512.

The service delivery manager 503 controls reception of service data.

For example, when controlling real-time streaming data, the service delivery manager 503 may use the Real-time Transport Protocol/Real-time Transport Control Protocol (RI P/RTCP). If real-time streaming data is transmitted over RIP, the service delivery manager 503 parses the received real-time streaming data using RIP and transmits the parsed real-time streaming data to the DEMUX 505 or stores the parsed real-time streaming data in the SI & metadata DB 511 under the control of the service manager 513. In addition, the service delivery manager 503 feeds back network reception information to a server that provides the service using RTCP.

The DEMUX 505 demultiplexes a received packet into audio data, video data and PSI data and transmits the audio data, video data and PSI data to the audio decoder 506, the video decoder 507, and the PSI & (PSIP and/or SI) decoder 504, respectively.

The PSI & (PSIP and/or SI) decoder 504 decodes SI such as PSI. More specifically, the PSI & (PSIP and/or SI) decoder 504 receives and decodes PSI sections, PSIP sections or SI sections demultiplexed by the DEMUX 505.

The PSI & (PSIP and/or SI) decoder 504 constructs an SI DB by decoding the received sections and stores the SI DB in the SI & metadata DB 511.

The audio decoder 506 and the video decoder 507 decode the audio data and the video data received from the DEMUX 505 and output the decoded audio and video data to a user through the display A/V and OSD module 508.

The UI manager 514 and the service manager 513 manage the overall state of the image display device 500, provide UIs, and manage other managers.

The UI manager 514 provides a Graphical User Interface (GUI) in the form of an OSD and performs a reception operation corresponding to a key input received from the user. For example, upon reception of a key input signal regarding channel selection from the user, the UI manager 514 transmits the key input signal to the service manager 513.

The service manager 513 controls managers associated with services, such as the service delivery manager 503, the service discovery manager 510, the service control manager 509, and the metadata manager 512.

The service manager 513 also creates a channel map and selects a channel using the channel map according to the key input signal received from the UI manager 514. The service manager 513 sets the audio/video Packet ID (PID) of the selected channel based on SI of the channel received from the PSI & (PSIP and/or SI) decoder 504 in the demultiplexer 505.

The service discovery manager 510 provides information necessary to select an SP that provides a service. Upon receipt of a channel selection signal from the service manager 513, the service discovery manager 510 detects a service based on the channel selection signal.

The service control manager 509 takes charge of selection and control services. For example, if a user selects a live broadcasting service, such as a conventional broadcasting service, the service control manager selects and controls the service using Internet Group Management Protocol (IGMP) or Real-Time Streaming Protocol (RTSP). If the user selects Video on Demand (VoD), the service control manager 509 selects and controls the service using RTSP.

RTSP supports trick mode for real-time streaming. Further, the service control manager 509 may initialize and manage a session through an IP Multimedia Control (IMC) gateway using IP Multimedia Subsystem (IMS) and Session Initiation Protocol (SIP). The protocols are only exemplary and thus other protocols are also applicable.

The metadata manager 512 manages metadata related to services and stores the metadata in the SI & metadata DB 511.

The SI & metadata DB 511 stores the SI decoded by the PSI & (PSIP and/or SI) decoder 504, the metadata managed by the metadata manager 512, and the information required to select an SP, received from the service discovery manager 510. The SI & metadata DB 511 may store system setup data.

The SI & metadata DB 511 may be constructed in a Non-Volatile RAM (NVRAM) or a flash memory.

An IMS Gateway (IG) 550 is a gateway equipped with functions needed to access IMS-based IPTV services.

The UI manager 514 of the image display device 500 shown in FIG. 5 serves to control the game application according to one embodiment. In particular, the UI manager 514 operates according to a user input signal.

Figure 6:
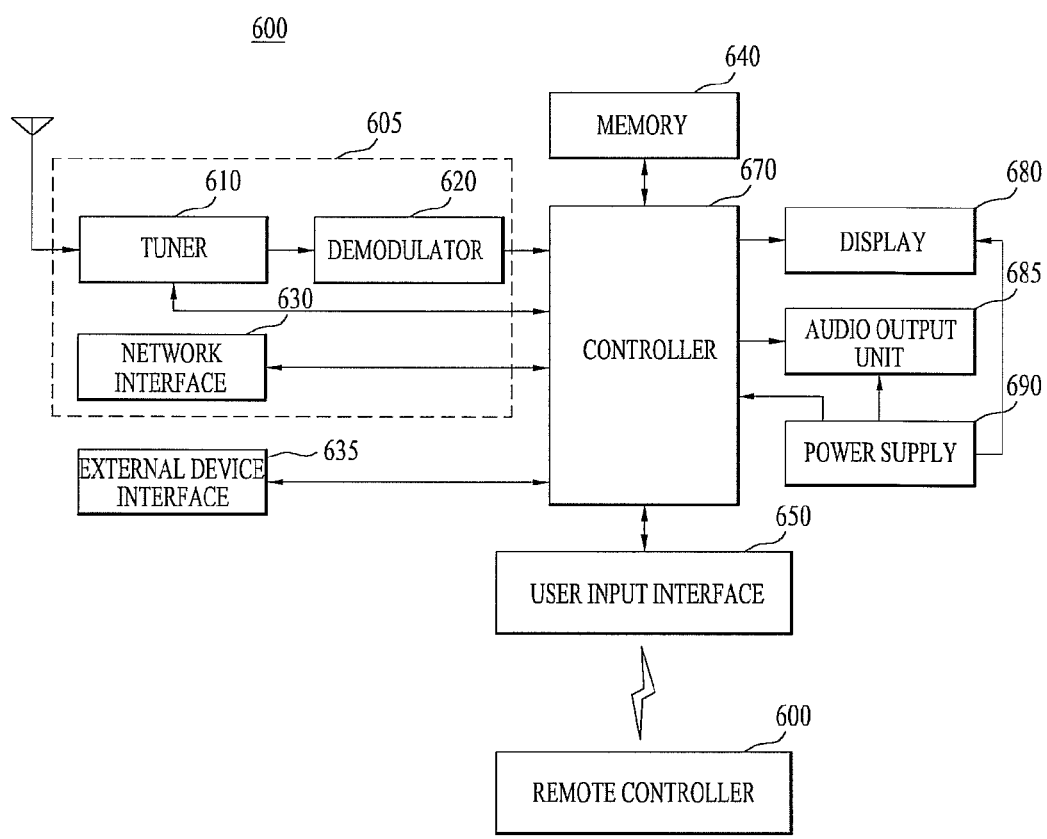
FIG. 6 shows another example of the image display device.

FIG. 6 is a detailed block diagram of the image display device shown in FIG. 1 or 2 according to another embodiment.

Referring to FIG. 6, an image display device 600 according to another embodiment includes a broadcast receiver 605, an external device interface 635, a memory 640, a user input interface 650, a controller 670, a display 680, an audio output unit 685, a power supply 690, and a camera module (not shown). The broadcasting receiver 605 may include a tuner 610, a demodulator 620 and a network interface 630. As needed, the broadcasting receiver 605 may be configured so as to include only the tuner 610 and the demodulator 620 or only the network interface 630.

The tuner 610 tunes to a Radio Frequency (RF) broadcast signal corresponding to a channel selected by a user from among a plurality of RF broadcast signals received through an antenna and downconverts the tuned RF broadcast signal into a digital Intermediate Frequency (IF) signal or an analog baseband video or audio signal.

More specifically, if the tuned RF broadcast signal is a digital broadcast signal, the tuner 610 downconverts the tuned RF broadcast signal into a digital IF signal DIF. On the other hand, if the tuned RF broadcast signal is an analog broadcast signal, the tuner 610 downconverts the tuned RF broadcast signal into an analog baseband video or audio signal CVBS/SIF. That is, the tuner 610 may be a hybrid tuner capable of processing not only digital broadcast signals but also analog broadcast signals. The analog baseband video or audio signal CVBS/SIF may be directly input to the controller 670.

The tuner 610 may be capable of receiving RF broadcast signals from an Advanced Television Systems Committee (ATSC) single-carrier system or from a Digital Video Broadcasting (DVB) multi-carrier system.

The tuner 610 may sequentially tune to a number of RF broadcast signals corresponding to all broadcast channels previously stored by a channel storage function from a plurality of RF signals received through the antenna and may downconvert the tuned RF broadcast signals into IF signals or baseband video or audio signals.

The demodulator 620 receives the digital IF signal DIF from the tuner 610 and demodulates the digital IF signal DIF.

For example, if the digital IF signal DIF is an ATSC signal, the demodulator 620 may perform 8-Vestigal SideBand (VSB) demodulation on the digital IF signal DIF. The demodulator 620 may also perform channel decoding.

For channel decoding, the demodulator 620 may include a Trellis decoder (not shown), a de-interleaves (not shown) and a Reed-Solomon decoder (not shown) so as to perform Trellis decoding, de-interleaving and Reed-Solomon decoding.

For example, if the digital IF signal DIF is a DVB signal, the demodulator 620 performs Coded Orthogonal Frequency Division Multiple Access (COFDMA) demodulation upon the digital IF signal DIF. The demodulator 620 may also perforin channel decoding. For channel decoding, the demodulator 620 may include a convolution decoder (not shown), a de-interleaves (not shown), and a Reed-Solomon decoder (not shown) so as to perform convolution decoding, de-interleaving, and Reed-Solomon decoding.

The demodulator 620 may perform demodulation and channel decoding on the digital IF signal DIF, thereby obtaining a Transport Stream (TS). The TS may be a signal in which a video signal, an audio signal and a data signal are multiplexed. For example, the TS may be an MPEG-2 TS in which an MPEG-2 video signal and a Dolby AC-3 audio signal are multiplexed. An MPEG-2 TS may include a 4-byte header and a 184-byte payload.

In order to properly handle not only ATSC signals but also DVB signals, the demodulator 620 may include an ATSC demodulator and a DVB demodulator.

The TS output from the demodulator 620 may be input to the controller 670 and thus subjected to demultiplexing and A/V signal processing. The processed video and audio signals are output to the display 680 and the audio output unit 685, respectively.

The external device interface 635 may serve as an interface between an external device and the image display device 600. For interfacing, the external device interface 635 may include an A/V Input/Output (I/O) unit (not shown) and/or a wireless communication module (not shown).

The external device interface 635 may be connected to an external device such as a Digital Versatile Disc (DVD) player, a Blu-ray player, a game console, a camera, a camcorder, or a computer (e.g., a laptop computer), wirelessly or by wire. Then, the external device interface 635 externally receives video, audio, and/or data signals from the external device and transmits the received input signals to the controller 670. In addition, the external device interface 635 may output video, audio, and data signals processed by the controller 670 to the external device. In order to receive or transmit audio, video and data signals from or to the external device, the external device interface 635 includes the A/V I/O unit (not shown) and/or the wireless communication module (not shown).

The A/V I/O unit may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, and a D-sub port, in order to input the video and audio signals of the external device to the image display device 600.

The wireless communication module may perform short-range wireless communication with other electronic devices. For short-range wireless communication, the wireless communication module may use Bluetooth, Radio-Frequency IDentification (RFID), Infrared Data Association (IrDA), Ultra WideBand (UWB), ZigBee, and Digital Living Network Alliance (DLNA) communication standards.

The external device interface 635 may be connected to various set-top boxes through at least one of the above-described ports and may thus perform an I/O operation with the various set-top boxes.

The external device interface 635 may receive applications or an application list from an adjacent external device and provide the applications or the application list to the controller 670 or the memory 640.

The network interface 630 serves as an interface between the image display device 600 and a wired/wireless network such as the Internet. The network interface 630 may include an Ethernet port for connection to a wired network. For connection to wireless networks, the network interface 630 may use Wireless Local Area Network (WLAN) (i.e., Wi-Fi), Wireless Broadband (WiBro), World Interoperability for Microwave Access (WiMax), and High Speed Downlink Packet Access (HSDPA).

The network interface 630 may transmit data to or receive data from another user or electronic device over a connected network or another network linked to the connected network. Especially, the network interface 630 may transmit data stored in the image display device 600 to a user or electronic device selected from among users or electronic devices pre-registered with the image display device 600.

The network interface 630 may access a specific Web page over a connected network or another network linked to the connected network. That is, the network interface 630 may access a specific Web page over a network and transmit or receive data to or from a server. Additionally, the network interface 630 may receive content or data from a CP or an NP. Specifically, the network interface 630 may receive content such as movies, advertisements, games, VoD, and broadcast signals, and information related to the content from a CP or an NP. Also, the network interface 630 may receive update information about firmware from the NP and update the firmware. The network interface 630 may transmit data over the Internet or to the CP or the NP.

The network interface 630 may selectively receive a desired application among open applications over a network.

In an embodiment, when a game application is executed in the image display device, the network interface 630 may transmit data to or receive data from a user terminal connected to the image display device through a network. In addition, the network interface 630 may transmit specific data to or receive specific data from a server that records game scores.

The memory 640 may store various programs necessary for the controller 670 to process and control signals, and may also store processed video, audio and data signals. The memory 640 may temporarily store a video, audio and/or data signal received from the external device interface 635 or the network interface 630. The memory 640 may store information about broadcast channels by the channel storage function. The memory 640 may store applications or a list of applications received from the external device interface 135 or the network interface 630. The memory 640 may store a variety of platforms which will be described later.

In an embodiment, when the image display device provides a game application, the memory 640 may store user-specific information and game play information of a user terminal used as a game controller.

The memory 640 may include, for example, at least one of a flash memory-type storage medium, a hard disk-type storage medium, a multimedia card micro-type storage medium, a card-type memory (e.g. a Secure Digital (SD) or extreme Digital (XD) memory), a Random Access Memory (RAM), or a Read-Only Memory (ROM) such as an Electrically Erasable and Programmable Read Only Memory (EEPROM). The image display device 600 may reproduce content stored in the memory 640 (e.g. video files, still image files, music files, text files, and application files) to the user.

While the memory 640 is shown in FIG. 6 as configured separately from the controller 670, to which the present embodiment is not limited, the memory 640 may be incorporated into the controller 670, for example.

The user input interface 650 transmits a signal received from the user to the controller 670 or transmits a signal received from the controller 670 to the user.

For example, the user input interface 650 may receive control signals such as a power-on/off signal, a channel selection signal, and a screen setting signal from a remote controller 611 or may transmit a control signal received from the controller 670 to the remote controller 611, according to various communication schemes, for example, RF communication and IR communication.

For example, the user input interface 650 may provide the controller 670 with control signals received from local keys (not shown), such as inputs of a power key, a channel key, and a volume key, and setting values.

Also, the user input interface 650 may transmit a control signal received from a sensor unit (not shown) for sensing a user gesture to the controller 670 or transmit a signal received from the controller 670 to the sensor unit. The sensor unit may include a touch sensor, a voice sensor, a position sensor, a motion sensor, etc.

The controller 670 may demultiplex the TS received from the tuner 610, the demodulator 620, or the external device interface 635 into a number of signals and process the demultiplexed signals into audio and video data.

The video signal processed by the controller 670 may be displayed as an image on the display 680. The video signal processed by the controller 670 may also be transmitted to an external output device through the external device interface 635.

The audio signal processed by the controller 670 may be audibly output through the audio output unit 685. Also, the audio signal processed by the controller 670 may be transmitted to the external output device through the external device interface 635.

While not shown in FIG. 6, the controller 670 may include a DEMUX and a video processor, which will be described later with reference to FIG. 10.

In addition, the controller 670 may provide overall control to the image display device 600. For example, the controller 670 may control the tuner 610 to tune to an RF broadcast signal corresponding to a user-selected channel or a pre-stored channel.

The controller 670 may control the image display device 600 according to a user command received through the user input interface 650 or according to an internal program Especially the controller 670 may access a network and download an application or application list selected by the user to the image display device 600 over the network.

For example, the controller 670 controls the tuner 610 to receive a signal of a channel selected according to a specific channel selection command received through the user input interface 650 and processes a video, audio and/or data signal of the selected channel. The controller 670 outputs the processed video or audio signal along with information about the user-selected channel to the display 680 or the audio output unit 685.

As another example, the controller 670 outputs a video or audio signal received from an external device such as a camera or a camcorder through the external device interface 635 to the display 680 or the audio output unit 685 according to an external device video playback command received through the external device interface 650.

The controller 670 may control the display 680 to display images. For instance, the controller 670 may control the display 680 to display a broadcast image received from the tuner 610, an externally input image received through the external device interface 635, an image received through the network interface 630, or an image stored in the memory 640. The image displayed on the display 680 may be a Two-Dimensional (2D) or Three-Dimensional (3D) still image or moving picture.

The controller 670 may control content playback. The content may include any content stored in the image display device 600, received broadcast content, and externally input content. The content includes at least one of a broadcast image, an externally input image, an audio file, a still image, a Web page, or a text file.

Upon receipt of a return-to-home screen input, the controller 670 may control display of the home screen on the display 680.

The home screen may include a plurality of card objects classified according to content sources. The card objects may include at least one of a card object representing a thumbnail list of broadcast channels, a card object representing a broadcast program guide, a card object representing a program reservation list or a program recording list, or a card object representing a media list of a device connected to the image display device.

The card objects may further include at least one of a card object representing a list of connected external devices or a card object representing a call-associated list.

The home screen may further include an application menu including at least one application that can be executed. Accordingly, the game application according to one embodiment may be designed in a format selectable through the application menu of the above-described home screen. Further, user convenience may be improved by adding or deleting the game application to or from the application menu according to user selection.

Upon receipt of a card object move input, the controller 670 may control movement of a card object corresponding to the card object move input on the display 680, or if the card object is not displayed on the display 680, the controller 670 may control display of the card object on the display 680.

When a card object is selected from among the card objects on the home screen, the controller 670 may control display of an image corresponding to the selected card object on the display 680.

The controller 670 may control display of an input broadcast image and an object representing information about the broadcast image in a card object representing broadcast images. The size of the broadcast image may be set to a fixed size.

The controller 670 may control display of a set-up object for at least one of image setting, audio setting, screen setting, reservation setting, setting of a pointer of the remote controller, or network setting on the home screen.

The controller 670 may control display of a log-in object, a help object, or an exit object on a part of the home screen.

The controller 670 may control display of an object representing the total number of available card objects or the number of card objects displayed on the display 680 among all card objects, on a part of the home screen.

If one of the card objects displayed on the display 680 is selected, the controller 670 may fullscreen the selected card object to cover the entirety of the display 680.

Upon receipt of an incoming call at a connected external device or the image display device 600, the controller 670 may control focusing-on or shift of a call-related card object among the plurality of card objects.

If an application view menu item is selected, the controller 670 may control display of applications or a list of applications that are present in the image display device 600 or downloadable from an external network.

The controller 670 may control installation and execution of an application downloaded from the external network along with various UIs.

Also, the controller 670 may control display of an image related to the executed application on the display 680, upon user selection.

In an embodiment, when the image display device provides a game application, the controller 670 may control assignment of player IDs to specific user terminals, creation of game play information by executing the game application, transmission of the game play information corresponding to the player IDS assigned to the user terminals through the network interface 630, and reception of the game play information at the user terminals.

The controller 670 may control detection of user terminals connected to the image display device over a network through the network interface 630, display of a list of the detected user terminals on the display 680 and reception of a selection signal indicating a user terminal selected for use as a user controller from among the detected user terminals through the user input interface 650.

The controller 670 may control output of a game play screen of the game application, inclusive of player information of each user terminal and game play information, through the display 680.

The controller 670 may determine the specific signal received from a user terminal through the network interface 630 as game play information and thus control the game play information to be reflected in the game application in progress.

The controller 670 may control transmission of the game play information of the game application to a specific server connected over a network through the network interface 630.

As another embodiment, upon receipt of information about a change in the game play information from a predetermined server through the network interface 630, the controller 670 may control output of a notification message in a predetermined area of the display 680.

Although not shown, the image display device 600 may further include a channel browsing processor for generating thumbnail images corresponding to channel signals or externally input signals.

The channel browsing processor may receive the TS output from the demodulator 620 or the TS output from the external device interface 635, extract images of the received TS and generate thumbnail images. The thumbnail images may be directly output to the controller 670 or may be output after being encoded. Also, it is possible to encode the thumbnail images into a stream and output the stream to the controller 670. The controller 670 may display a thumbnail list including a plurality of received thumbnail images on the display 680. The thumbnail images may be updated sequentially or simultaneously in the thumbnail list. Therefore, the user can readily identify the content of broadcast programs received through a plurality of channels.

The display 680 may convert a processed video signal, a processed data signal, and an OSD signal received from the controller 670 or a video signal and a data signal received from the external device interface 635 into RGB signals, thereby generating driving signals.

The display 680 may be various types of displays such as a Plasma Display Panel (PDP), a Liquid Crystal Display (LCD), an Organic Light-Emitting Diode (OLED) display, a flexible display, and a 3D display.

The display 680 may also be a touchscreen that can be used not only as an output device but also as an input device.

The audio output unit 685 may receive a processed audio signal (e.g., a stereo signal, a 3.1-channel signal or a 5.1-channel signal) from the controller 670 and output the received audio signal as sound. The audio output unit 685 may employ various speaker configurations.

To sense a user gesture, the image display device 600 may further include the sensor unit (not shown) that has at least one of a touch sensor, a voice sensor, a position sensor, and a motion sensor, as stated before. A signal sensed by the sensor unit may be output to the controller 670 through the user input interface 650.

The image display device 600 may further include the camera unit (not shown) for capturing images of a user. Image information captured by the camera unit may be input to the controller 670.

The controller 670 may sense a user gesture from an image captured by the camera unit or a signal sensed by the sensor unit, or by combining the captured image and the sensed signal.

The power supply 690 supplies power to the image display device 600. Particularly, the power supply 690 may supply power to the controller 670 which may be implemented as a System On Chip (SOC), the display 680 for displaying an image, and the audio output unit 685 for audio output.

For supplying power, the power supply 690 may include a converter (not shown) for converting Alternating Current (AC) into Direct Current (DC). If the display 680 is configured with, for example, a liquid crystal panel having a plurality of backlight lamps, the power supply 690 may further include an inverter (not shown) capable of performing Pulse Width Modulation (PWM) for luminance change or dimming driving.

The remote controller 611 transmits a user input to the user input interface 650. For transmission of user input, the remote controller 611 may use various communication techniques such as Bluetooth, RF communication, IR communication, Ultra Wideband (UWB) and ZigBee.

In addition, the remote controller 611 may receive a video signal, an audio signal or a data signal from the user input interface 650 and output the received signals visually, audibly or as vibrations.

The above-described image display device 600 may be a fixed digital broadcast receiver capable of receiving at least one of ATSC (8-VSB) broadcast programs, DVB-T (COFDM) broadcast programs, and ISDB-T (BST-OFDM) broadcast programs.

The block diagram of the image display device 600 illustrated in FIG. 6 is purely exemplary. Depending upon the specifications of the image display device 600 in actual implementation, the components of the image display device 600 may be combined or omitted or new components may be added. That is, two or more components may be incorporated into one component or one component may be configured as separate components, as needed. In addition, the function of each block is described for the purpose of describing one embodiment and thus specific operations or devices should not be construed as limiting the scope and spirit.

Unlike the configuration illustrated in FIG. 6, the image display device 600 may be configured so as to receive and play back video content through the network interface 630 or the external device interface 635, without the tuner 600 and the demodulator 620 shown in FIG. 6.

The game application according to one embodiment is received through the network interface 630 of the image display device 600 shown in FIG. 6. Further, the received game application is stored in the memory 640.

The network interface 630 performs communication with a mobile device executing the above-described game application.

The image display device 600 is an exemplary image signal processing device that processes a stored image or an input image. Other examples of the image signal processing device include a set-top box without the display 680 and the audio output unit 685, a DVD player, a Blu-ray player, a game console, and a computer. The set-top box will be described later with reference to FIGS. 7 and 8.

Figure 7:
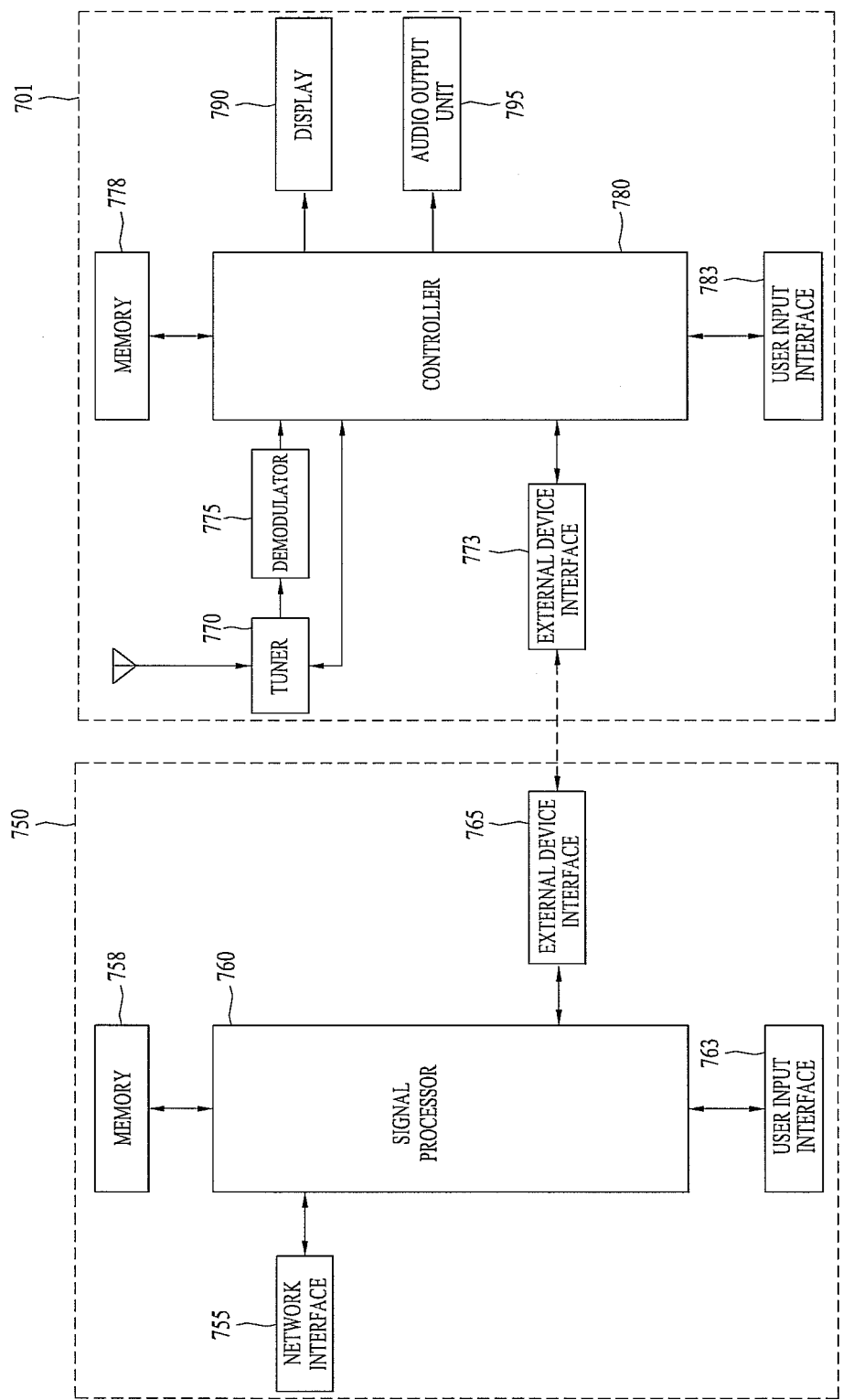
FIGS. 7 and 8 show that the image display device may be provided separately from a set-top box. Of course, in other embodiments, the circuits and/or software for receiving network, programming, and other information may be included within the display device itself.
Figure 8:
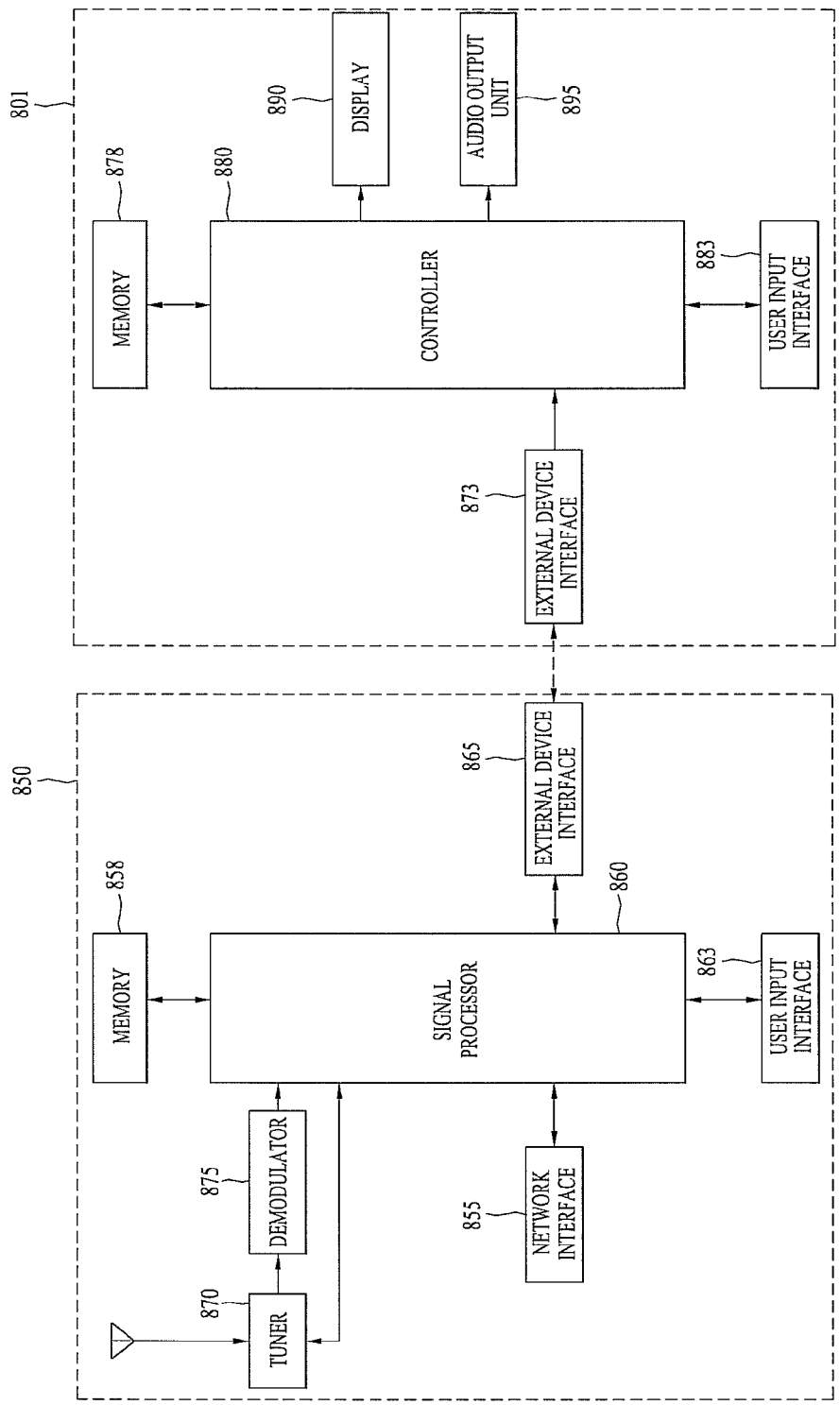

FIGS. 7 and 8 are diagrams illustrating any one of the image display devices separately as a set-top box and a display device according to one or more embodiments.

Referring to FIG. 7, a set-top box 750 and a display device 701 may transmit or receive data wirelessly or by wire. The set-top box 750 may include a network interface 755, a memory 758, a signal processor 760, a user input interface 763, and an external device interface 765.

The network interface 755 serves as an interface between the set-top box 750 and a wired/wireless network such as the Internet. The network interface 755 may transmit data to or receive data from another user or another electronic device over a connected network or over another network linked to the connected network.

The memory 758 may store programs necessary for the signal processor 760 to process and control signals and temporarily store a video, audio and/or data signal received from the external device interface 765 or the network interface 755. The memory 758 may also store platforms shown in FIGS. 11 and 12, as described later.

The signal processor 760 processes an input signal. For example, the signal processor 760 may demultiplex or decode an input video or audio signal. For signal processing, the signal processor 760 may include a video decoder or an audio decoder. The processed video or audio signal may be transmitted to the display device 701 through the external device interface 265.

The user input interface 763 transmits a signal received from the user to the signal processor 760 or a signal received from the signal processor 760 to the user. For example, the user input interface 763 may receive various control signals such as a power on/off signal, an operation input signal, and a setting input signal through a local key (not shown) or the remote controller and output the control signals to the signal processor 760.

The external device interface 765 serves as an interface between the set-top box 750 and an external device that is connected wirelessly or by wire, particularly the display device 701, for data transmission or reception. The external device interface 765 may also interface with an external device such as a game console, a camera, a camcorder, and a computer (e.g. a laptop computer), for data transmission or reception.

The set-top box 750 may further include a media input unit for media playback. The media input unit may be a Blu-ray input unit (not shown), for example. That is, the set-top box 750 may include a Blu-ray player. After signal processing such as demultiplexing or decoding in the signal processor 760, a media signal from a Blu-ray disc may be transmitted to the display device 701 through the external device interface 765 so as to be displayed on the display device 701.

The display device 701 may include a tuner 770, an external device interface 773, a demodulator 775, a memory 778, a controller 780, a user input interface 783, a display 790, and an audio output unit 795.

The tuner 770, the demodulator 775, the memory 778, the controller 780, the user input interface 783, the display 790 and the audio output unit 795 are identical respectively to the tuner 610, the demodulator 620, the memory 640, the controller 670, the user input interface 650, the display 680, and the audio output unit 685 illustrated in FIG. 6 and thus a description thereof is not provided herein.

The external device interface 773 serves as an interface between the display device 701 and a wireless or wired external device, particularly the set-top box 750, for data transmission or reception.

Hence, a video signal or an audio signal received through the set-top box 750 is output through the display 790 or through the audio output unit 795 under control of the controller 780.

Referring to FIG. 8, the configuration of the set-top box 850 and the display device 801 shown in FIG. 8 is similar to that of the set-top box 750 and the display device 701 shown in FIG. 7, except that the tuner 870 and the demodulator 875 reside in the set-top box 850, not in the display device 801. Thus the following description will focus upon such difference.

The signal processor 860 may process a broadcast signal received through the tuner 870 and the demodulator 875. The user input interface 863 may receive a channel selection input, a channel store input, etc.

Figure 9:
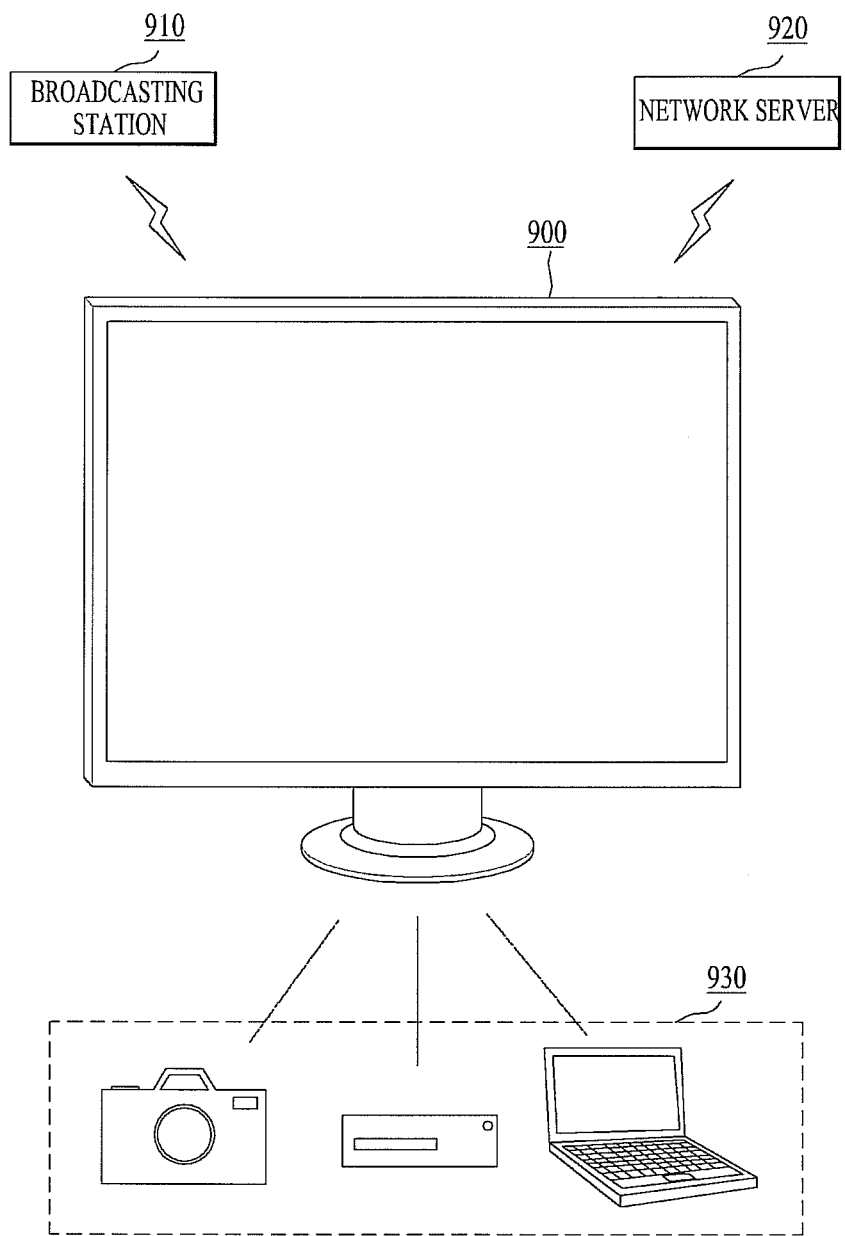
FIG. 9 shows an operation for communicating with one or more third devices in either of the image display devices.

FIG. 9 is a diagram illustrating an operation for communicating with third devices in either of the image display devices according to the embodiments. The image display device shown in FIG. 9 may be one of the above-described image display devices according to the embodiments.

As shown in FIG. 9, the image display device 900 according to one embodiment may communicate with a broadcast station 910, a network server 920, or an external device 930.

The image display device 900 may receive a broadcast signal including a video signal from the broadcast station 910. The image display device 900 may process the audio and video signals of the broadcast signal or the data signal of the broadcast signal, suitably for output from the image display device 900. The image display device 900 may output video or audio based on the processed video or audio signal.

Meanwhile, the image display device 900 may communicate with the network server 920. The network server 920 is capable of transmitting signals to and receiving signals from the image display device 900 over a network.

For example, the network server 920 may be a portable terminal that can be connected to the image display device 900 through a wired or wireless base station. In addition, the network server 920 may provide content to the image display device 900 over the Internet. A CP may provide content to the image display device 900 through the network server.

The image display device 900 may communicate with the external device 930. The external device 930 can transmit and receive signals directly to and from the image display device 900 wirelessly or by wire. For instance, the external device 930 may be a media storage or player. That is, the external device 930 may be any of a camera, a DVD player, a Blu-ray player, a PC, etc.

The broadcast station 910, the network server 920 or the external device 930 may transmit a signal including a video signal to the image display device 900. The image display device 900 may display an image based on the video signal included in the received signal. Also, the image display device 900 may transmit a signal transmitted from the network server 920 to the broadcast station 910 to the external device 930 and may transmit a signal transmitted from the external device 930 to the image display device 900 to the broadcast station 910 or the network server 920. That is, the image display device 900 may transmit content included in signals received from the broadcast station 910, the network server 920, and the external device 930 or may immediately play back the content.

Figure 10:
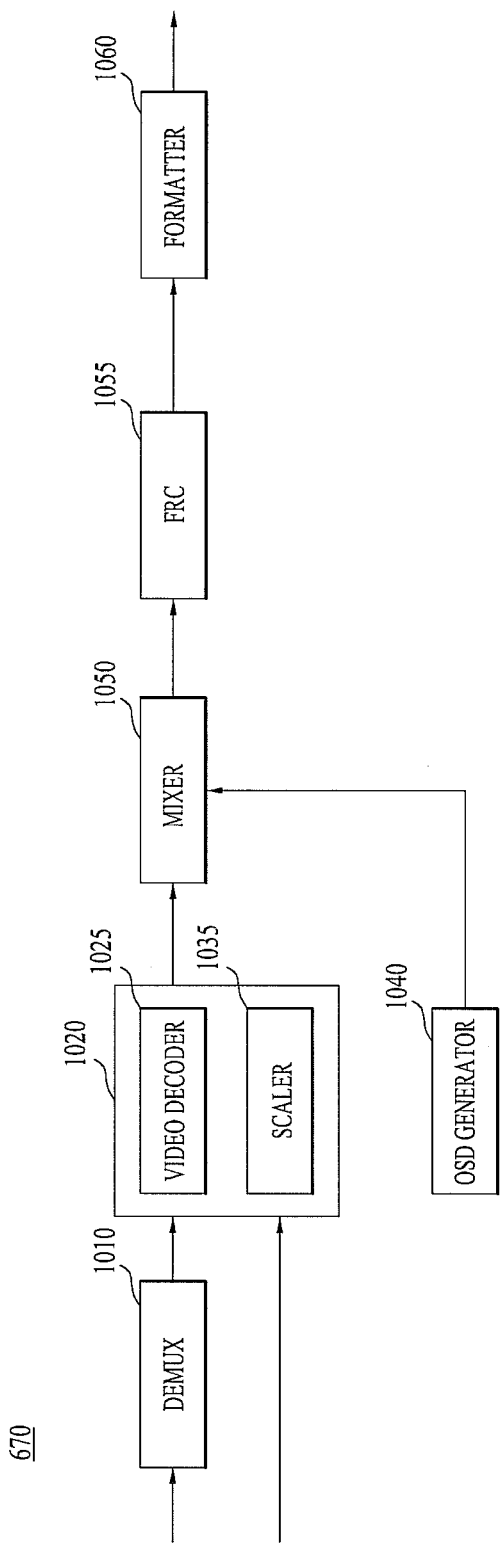
FIG. 10 shows one type of controller that may be used in FIG. 6.

FIG. 10 is a block diagram of the controller shown in FIG. 6. The controller will be described with reference to FIGS. 10 and 6.

The controller 670 may include a DEMUX 1010, a video processor 1020, an OSD generator 1040, a mixer 1050, a Frame Rate Converter (FRC) 1055, and a formatter 1060 according to an embodiment. The controller 670 may further include an audio processor (not shown) and a data processor (not shown).

The DEMUX 1010 demultiplexes an input stream. For example, the DEMUX 1010 may demultiplex an MPEG-2 TS into a video signal, an audio signal, and a data signal. The stream signal input to the DEMUX 1010 may be received from the tuner 610, the demodulator 620 or the external device interface 635.

The video processor 1020 may process the demultiplexed video signal.

For video signal processing, the video processor 1020 may include a video decoder 1025 and a scaler 1035.

The video decoder 1025 decodes the demultiplexed video signal and the scaler 1035 scales the decoded video signal so that the video signal can be displayed on the display 680.

The video decoder 1025 may be provided with decoders that operate based on various standards.

If the demultiplexed video signal is, for example, an MPEG-2 encoded video signal, the video signal may be decoded by an MPEG-2 decoder.

On the other hand, if the video signal is an H.264-encoded DMB or DVB-handheld (DVB-H) signal, the video signal may be decoded by an H.264 decoder.

The video signal decoded by the video processor 1020 is provided to the mixer 1050.

The OSD generator 1040 generates an OSD signal autonomously or according to user input. For example, the OSD generator 1040 may generate signals by which a variety of information is displayed as graphics or text on the display 680, based on control signals received from the user input interface 650. The generated OSD signal may include various data such as a UI screen, a variety of menu screens, widgets, icons, etc. of the image display device 600

For example, the OSD generator 1040 may generate a signal by which subtitles are displayed for a broadcast image or Electronic Program Guide (EPG)-based broadcasting information.

The mixer 1050 may mix the decoded video signal processed by the image processor with the OSD signal generated by the OSD generator 1040 and output the mixed signal to the formatter 1060. As the decoded broadcast video signal or the externally input signal is mixed with the OSD signal, an OSD may be overlaid on the broadcast image or the externally input image.

The FRC 1055 may change the frame rate of an input image signal. For example, a frame rate of 60 Hz is converted into a frame rate of 120 or 240 Hz. When the frame rate is to be changed from 60 Hz to 120 Hz, a first frame is inserted between the first frame and a second frame, or a predicted third frame is inserted between the first and second frames. If the frame rate is to be changed from 60 Hz to 240 Hz, three identical frames or three predicted frames are inserted between the first and second frames. It is also possible to maintain the frame rate of the input image without frame rate conversion.

The formatter 1060 changes the format of the signal received from the FRC 355 to suit the display 680. For example, the formatter 1060 may convert a received signal into an RGB data signal. The RGB signal may be output in the form of a Low Voltage Differential Signal (LVDS) or mini-LVDS.

The audio processor (not shown) of the controller 670 may process the demultiplexed audio signal. For audio signal processing, the audio processor (not shown) may have a plurality of decoders.

If the demultiplexed audio signal is a coded audio signal, the audio processor (not shown) of the controller 670 may decode the audio signal. For example, the demultiplexed audio signal may be decoded by an MPEG-2 decoder, an MPEG-4 decoder, an Advanced Audio Coding (AAC) decoder, or an AC-3 decoder.

The audio processor (not shown) of the controller 670 may also adjust the bass, treble or volume of the audio signal.

The data processor (not shown) of the controller 670 may process the demultiplexed data signal. For example, if the demultiplexed data signal is an encoded data signal such as an Electronic Program Guide (EPG) which includes broadcast information specifying the start time, end time, etc. of scheduled broadcast programs of each channel, the controller 670 may decode the data signal. Examples of an EPG include ATSC-Program and System Information Protocol (PSIP) information and DVB-Service Information (SI).

ATSC-PSIP information or DVB-SI may be included in the header of the above-described TS, i.e., a 4-byte header of an MPEG-2 TS.

The block diagram of the controller 670 shown in FIG. 10 is an embodiment. Depending upon the specifications of the controller 670, the components of the controller 670 may be combined, or omitted. Or new components may be added to the controller 670.

Figure 11:
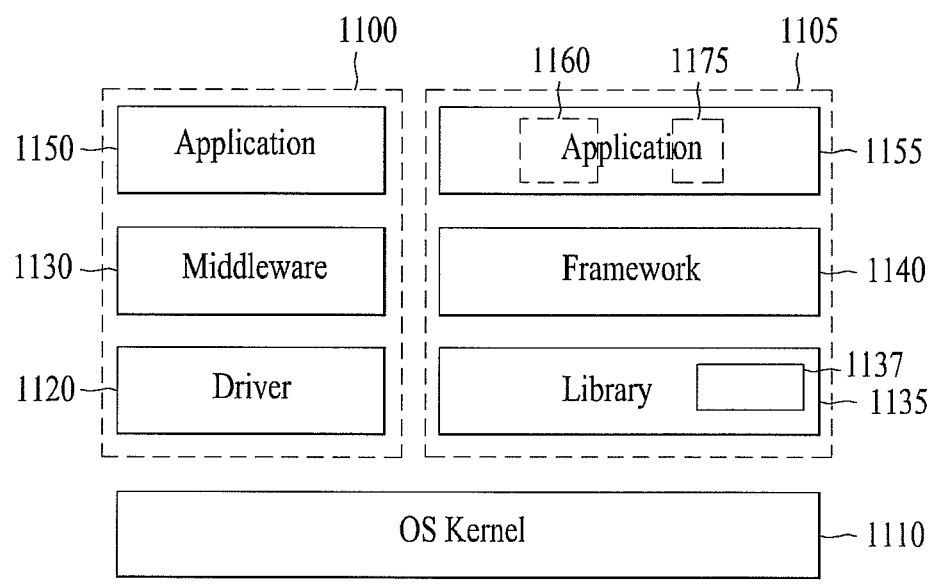
FIG. 11 shows a platform architecture for the image display devices.

FIG. 11 is a diagram showing an example of a platform architecture for either of the image display devices according to the embodiments.

Figure 12:
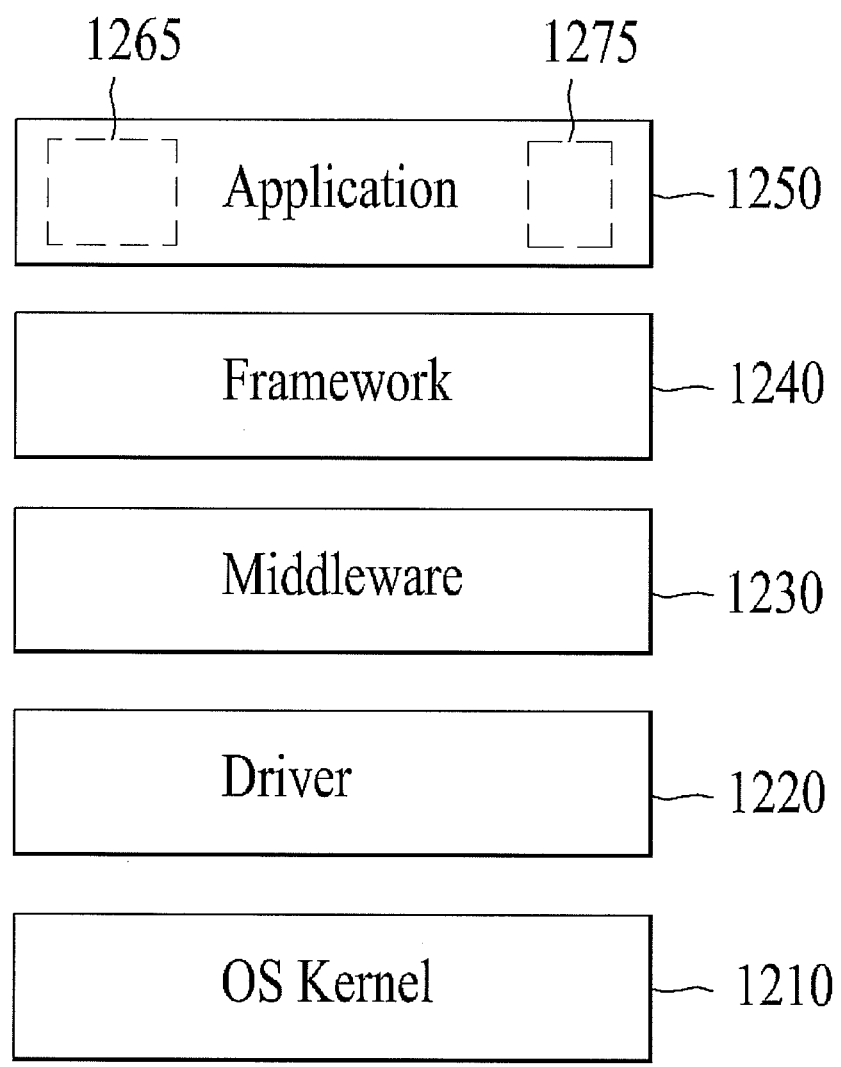
FIG. 12 shows another example of a platform architecture.

FIG. 12 is a diagram showing another example of a platform architecture for either of the image display devices according to the embodiments.

A platform for either of the image display devices according to the embodiments may have OS-based software to implement the above-described various operations.

Referring to FIG. 11, a platform for either of the image display devices according to the embodiments is of a separate type. The platform may be designed separately as a legacy system platform 1100 and a smart system platform 1105. An OS kernel 1110 may be shared between the legacy system platform 1100 and the smart system platform 405.

The legacy system platform 1100 may include a stack of a driver 1120, middleware 1130, and an application layer 1150 on the OS kernel 1110.

On the other hand, the smart system platform 1105 may include a stack of a library 1135, a framework 1140, and an application layer 1155 on the OS kernel 1110.

The OS kernel 1110 is the core of an operating system. When the image display device is driven, the OS kernel 1110 may be responsible for operation of at least one of control of hardware drivers, security protection for hardware and processors in the image display device, efficient management of system resources, memory management, hardware interfacing by hardware abstraction, multi-processing, or scheduling associated with multi-processing. Meanwhile, the OS kernel 1110 may further perform power management.

The hardware drivers of the OS kernel 1110 may include, for example, at least one of a display driver, a Wi-Fi driver, a Bluetooth driver, a USB driver, an audio driver, a power manager, a binder driver, or a memory driver.

Alternatively or additionally, the hardware drivers of the OS kernel 1110 may be drivers for hardware devices within the OS kernel 1110. The hardware drivers may include a character device driver, a block device driver, and a network device driver. The block device driver may require a buffer for buffering data on a block basis, because data is transmitted on a block basis. The character device driver may not need a buffer since data is transmitted on a basic data unit basis, that is, on a character basis.

The OS kernel 1110 may be implemented based on any of various OSs such as Unix (Linux), Windows, etc. The OS kernel 1110 may be a general-purpose open-source kernel which can be implemented in other electronic devices.

The driver 1120 is interposed between the OS kernel 1110 and the middleware 1130. Along with the middleware 1130, the driver 1120 drives devices for operation of the application layer 1150. For example, the driver 1120 may include a driver (s) for a microcomputer, a display module, a Graphics Processing Unit (GPU), an FRC, a General-Purpose Input/Output (GPIO) pin, a High-Definition Multimedia Interface (HDMI), a System Decoder (SDEC) or DEMUX, a Video Decoder (VDEC), an Audio Decoder (ADEC), a Personal Video Recorder (PVR), and/or an Inter-Integrated Circuit (I2C). These drivers operate in conjunction with the hardware drivers of the OS kernel 1110.

In addition, the driver 1120 may further include a driver for the remote controller, especially a pointing device to be described below. The remote controller driver may reside in the OS kernel 1110 or the middleware 1130, instead of the driver 1120.

The middleware 1130 resides between the OS kernel 1110 and the application layer 1150. The middleware 1130 may mediate between different hardware devices or different software programs, for data transmission and reception between the hardware devices or the software programs. Therefore, the middleware 1130 can provide standard interfaces, support various environments, and enable interaction between tasks conforming to heterogeneous communication protocols.

Examples of the middleware 1130 in the legacy system platform 1100 may include Multimedia and Hypermedia information coding Experts Group (MHEG) and Advanced Common Application Platform (ACAP) as data broadcasting-related middleware, PSIP or SI middleware as broadcasting information-related middleware, and DLNA middleware as peripheral device communication-related middleware.

The application layer 1150 that runs atop the middleware 1130 in the legacy system platform 1100 may include, for example, UI applications associated with various menus in the image display device. The application layer 1150 on top of the middleware 1130 may allow editing and updating over a network by user selection. Through the application layer 1150, the user may navigate a desired menu by manipulating the remote controller while viewing a broadcast program.

The application layer 1150 in the legacy system platform 1100 may further include at least one of a TV guide application, a Bluetooth application, a reservation application, a Digital Video Recorder (DVR) application, and a hotkey application.

In the smart system platform 1105, the library 1135 is positioned between the OS kernel 1110 and the framework 1140, forming the basis of the framework 1140. For example, the library 1135 may include Secure Socket Layer (SSL) (a security-related library), WebKit (a Web engine-related library), c library (libc), and Media Framework (a media-related library) specifying, for example, a video format and an audio format. The library 1135 may be written in C or C++. Also, the library 1135 may be exposed to a developer through the framework 1140.

The library 1135 may include a runtime 1137 with a core Java library and a Virtual Machine (VM). The runtime 1137 and the library 1135 form the basis of the framework 1140.

The VM may be a virtual machine that enables concurrent execution of a plurality of instances, that is, multi-tasking. For each application of the application layer 1155, a VM may be allocated and executed. For scheduling or interconnection between the plurality of instances, the binder driver (not shown) of the OS kernel 1110 may operate.

The binder driver and the runtime 1137 may connect Java applications to C-based libraries.

The library 1135 and the runtime 1137 may correspond to the middleware 1130 of the legacy system platform.

In the smart system platform 1105, the framework 1140 includes programs on which applications of the application layer 1155 are based. The framework 1140 is compatible with any application and may allow component reuse, movement or exchange. The framework 1140 may include supporting programs and programs for interconnecting different software components. For example, the framework 1140 may include an activity manager related to activities of applications, a notification manager, and a CP for abstracting common information between applications. This framework 1140 may be written in Java.

The application layer 1155 on top of the framework 1140 includes a variety of programs that can be executed and displayed in the image display device. The application layer 1155 may include, for example, a core application that is a suite providing at least one of e-mail, Short Message Service (SMS), calendar, map, or browser functions. The application layer 1155 may be written in Java.

In the application layer 1155, applications may be categorized into user-undeletable applications 1165 stored in the image display device or user-deletable applications 1175 that are downloaded from an external device or a network and stored in the image display device.

Using the applications of the application layer 1155, a variety of functions such as an Internet telephony service, VoD service, Web album service, Social Networking Service (SNS), Location-Based Service (LBS), map service, Web browsing service, and application search service may be performed through network access. In addition, other functions such as gaming and schedule management may be performed by the applications.

Referring to FIG. 12, a platform for any of the image display devices according to the embodiments is of an integrated type. The integrated-type platform may include an OS kernel 1210, a driver 1220, middleware 1230, a framework 1240, and an application layer 1250.

The integrated-type platform shown in FIG. 11 is different from the separate-type platform shown in FIG. 11 in that the library 1135 shown in FIG. 11 is deleted and the application layer 1250 is included as an integrated layer. The driver 1220 and the framework 1240 correspond to the driver 1120 and the framework 1140 of FIG. 11, respectively.

The library 1135 of FIG. 11 may be incorporated into the middleware 1230 of FIG. 12. That is, the middleware 1230 may include both the legacy system middleware and the image display system middleware. As described before, the legacy system middleware includes MHEG or ACAP as data broadcasting-related middleware, PSIP or SI middleware as broadcasting information-related middleware, and DLNA middleware as peripheral device communication-related middleware, and the image display system middleware includes SSL as a security-related library, WebKit as a Web engine-related library, libc, and Media Framework as a media-related library. The middleware 1230 may further include the above-described runtime.

The application layer 1250 may include a menu-related application, a TV guide application, a reservation application, etc. as legacy system applications, and e-mail, SMS, a calendar, a map, and a browser as image display system applications.

In the application layer 1250, applications may be categorized into user-undeletable applications 1265 that are stored in the image display device and user-installable or user-deletable applications 1275 that are downloaded from an external device or a network and stored in the image display device.

The platforms shown in FIGS. 11 and 12 may be general-purpose ones that can be implemented in many other electronic devices as well as in image display devices. The platforms of FIGS. 11 and 12 may be stored or loaded in the memory 640, the controller 670, or any other processor (not shown) or may be stored or load in the SI & metadata DB 711, the UI manager 714 or the service manager 713 shown in FIG. 5. To execute applications, an additional application processor (not shown) may be further provided.

The game application according to one embodiment is located in the application layer shown in FIG. 11 or 12.

In particular, if the game application is installed in a process of producing a display device (e.g., TV), the display device is designed such that a user of the display device may not arbitrarily access or delete the game application.

Figure 13:
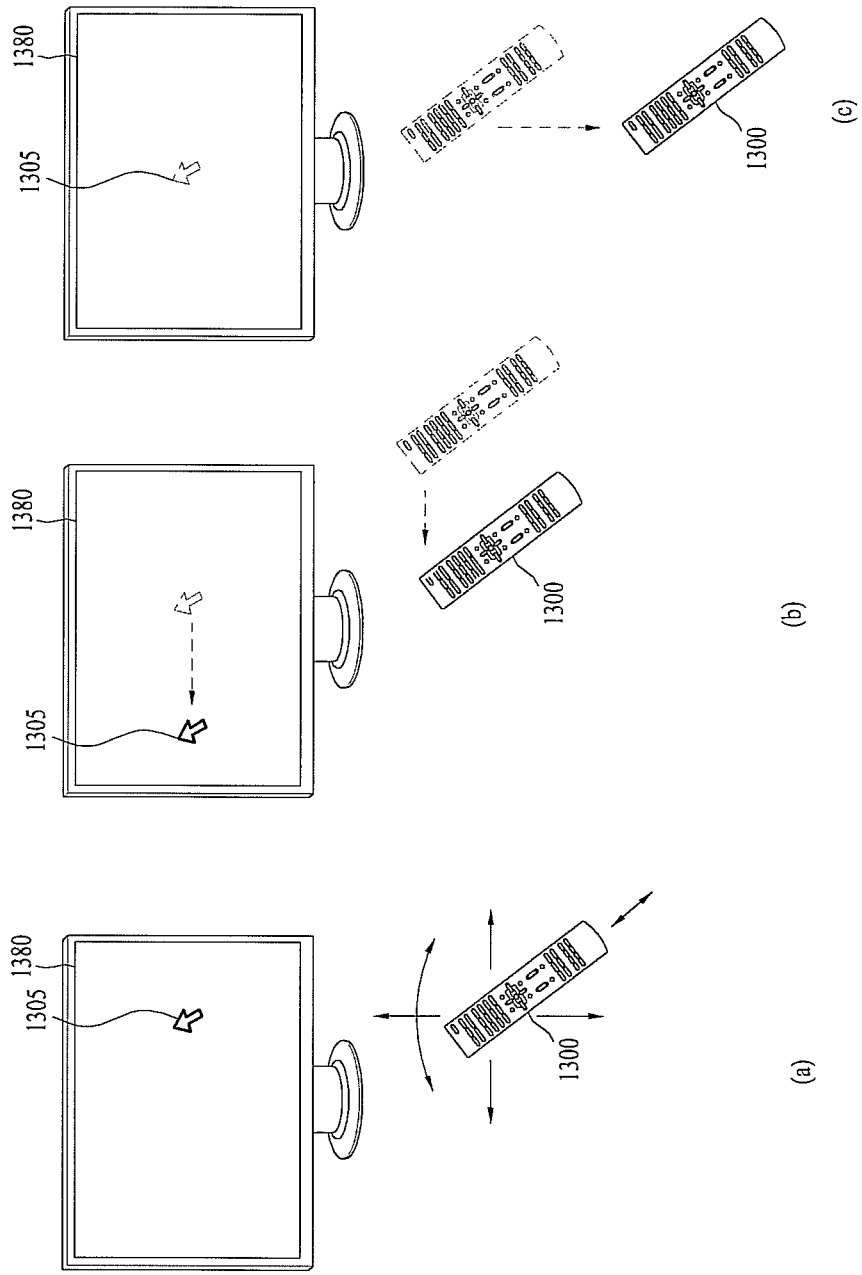
FIG. 13 shows one embodiment of a method for operating a remote controller for controlling an image display device.

FIG. 13 illustrates a method for controlling either of the image display devices according to the embodiments using a remote controller.

FIG. 13(*a*) illustrates a pointer 1305 representing movement of the remote controller 1300 displayed on the display 1380.

The user may move or rotate the remote controller 1300 up and down, side to side (FIG. 13(*b*)), and back and forth (FIG. 13(*c*)). The pointer 1305 displayed on the display 1380 of the image display device moves according to the movement of the remote controller 1300. Since the pointer 1305 moves in accordance with the movement of the remote controller 1300 in a 3D space as shown in FIG. 13, the remote controller 1300 may be referred to as a pointing device.

Referring to FIG. 13(*b*), if the user moves the remote controller 1300 to the left, the pointer 1305 moves to the left on the display 1380.

A sensor of the remote controller 1300 detects movement of the remote controller 1300 and transmits motion information of the remote controller 1300 to the image display device. Then, the image display device calculates the coordinates of the pointer 1305 from the motion information of the remote controller 1300. The image display device then displays the pointer 1305 at the calculated coordinates.

Referring to FIG. 13(*c*), while pressing a predetermined button of the remote controller 1300, the user moves the remote controller 1300 away from the display 1380. Then, a selected area corresponding to the pointer 1305 may be zoomed in on and enlarged on the display 1380. On the contrary, if the user moves the remote controller 1300 toward the display 180, the selected area corresponding to the pointer 1305 is zoomed out and thus contracted on the display 1380. On the contrary, when the remote controller 1300 moves away from the display 1380, the selected area may be zoomed out and when the remote controller 1300 approaches the display 180, the selected area may be zoomed in.

With the predetermined button of the remote controller 1300 pressed, the up, down, left and right movements of the remote controller 1300 may be ignored. That is, when the remote controller 1300 moves away from or approaches the display 1380, only the back and forth movements of the remote controller 1300 are sensed, while the up, down, left and right movements of the remote controller 1300 are ignored. Unless the predetermined button is pressed in the remote controller 1300, the pointer 1305 moves in accordance with the up, down, left or right movement of the remote controller 1300.

The movement speed and direction of the pointer 1305 may correspond to the movement speed and direction of the remote controller 1300.

The pointer of the present specification is an object displayed on the display 1380 in correspondence with the movement of the remote controller 1300. Therefore, the pointer 1305 may have various shapes other than the arrow illustrated in FIG. 13. For example, the pointer 1305 may be a dot, a cursor, a prompt, a thick outline, etc. The pointer 1305 may be displayed across a plurality of points, such as a line and a surface, as well as at a single point on horizontal and vertical axes.

Figure 14:
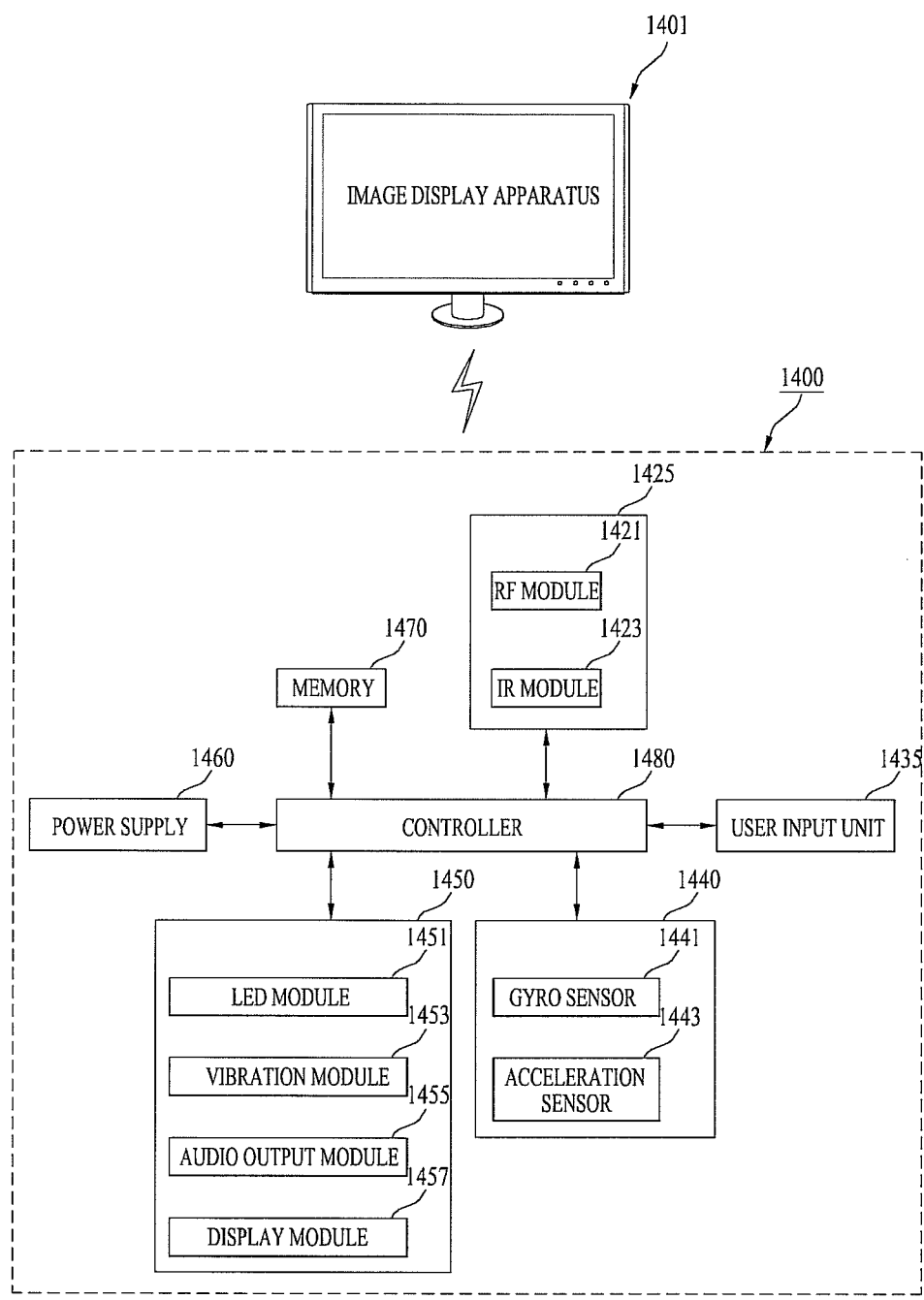
FIG. 14 shows one type of remote controller that may be used to control an image display device.

FIG. 14 is a detailed block diagram of the remote controller in either of the image display devices according to an embodiment. Referring to FIG. 14, the remote controller 1400 may include a wireless communication module 1425, a user input unit 1435, a sensor unit 1440, an output unit 1450, a power supply 1460, a memory 1470, and a controller 1480.

The wireless communication module 1425 transmits signals to and/or receives signals from either of the above-described image display devices according to the embodiments, that is, the image display device 1401.

The remote controller 1400 may include an RF module 1421 for transmitting RF signals to and/or receiving RF signals from the image display device 1401 according to an RF communication standard. The remote controller 1400 may also include an IR module 1423 for transmitting IR signals to and/or receiving IR signals from the image display device 1401 according to an IR communication standard.

In the present embodiment, the remote controller 1400 transmits motion information representing movement of the remote controller 1400 to the image display device 1401 through the RF module 221.

The remote controller 1400 may also receive signals from the image display device 1401 through the RF module 1421. As needed, the remote controller 1400 may transmit commands such as a power on/off command, a channel switch command, or a volume change command to the image display device 1401 through the IR module 1423.

The user input unit 1435 may include a keypad, a plurality of buttons, a touchpad and/or a touchscreen. The user may enter commands associated with the image display device 1401 to the remote controller 1400 by manipulating the user input unit 1435. If the user input unit 1435 includes a plurality of hard buttons, the user may input various commands associated with the image display device 1401 to the remote controller 1400 by pressing the hard buttons. Alternatively or additionally, if the user input unit 1435 includes a touchscreen displaying a plurality of soft keys, the user may input various commands associated with the image display device 1401 to the remote controller 1400 by touching the soft keys. The user input unit 1435 may also include various input tools other than those set forth herein, such as a scroll key and/or a jog wheel, which should not be construed as limiting the present embodiments.

The sensor unit 1440 may include a gyro sensor 241 and/or an acceleration sensor 1443.

The gyro sensor 1441 may sense movement of the remote controller 1400.

For example, the gyro sensor 1441 may sense movement of the remote controller 1400 in X, Y, and Z-axis directions. The acceleration sensor 1443 may sense the speed of the remote controller 1400. The sensor unit 1440 may further include a distance sensor for sensing the distance between the remote controller 1400 and the display device 1401.

The output unit 1450 may output a video and/or audio signal corresponding to manipulation of the user input unit 1435 or corresponding to a signal received from the image display device 1401. The user may easily identify whether the user input unit 1435 has been manipulated or whether the image display device 1401 has been controlled, based on the video and/or audio signal output by the output unit 1450.

The output unit 1450 may include a Light Emitting Diode (LED) module 1451 which is turned on or off whenever the user input unit 1435 is manipulated or whenever a signal is received from or transmitted to the image display device 1401 through the wireless communication module 1425, a vibration module 1453 which generates vibrations, an audio output module 1455 which outputs audio data, and/or a display module 1457 which outputs video data.

The power supply 1460 supplies power to the remote controller 1400. If the remote controller 1400 remains stationary for a predetermined time or longer, the power supply 1460 may, for example, reduce or shut off supply of power to the spatial remote controller 1400 in order to save power. The power supply 1460 may resume power supply if a predetermined key of the remote controller 1400 is manipulated.

The memory 1470 may store various types of programs and application data necessary to control or drive the remote controller 1400. The remote controller 1400 may wirelessly transmit signals to and/or receive signals from the image display device 1401 over a predetermined frequency band with the aid of the RF module 1421. The controller 1480 of the remote controller 1400 may store information regarding the frequency band used for the remote controller 1400 to wirelessly transmit signals to and/or wirelessly receive signals from the paired image display device 1401 in the memory 1470, for later use.

The controller 1480 provides overall control to the remote controller 1400. The controller 1480 may transmit a signal corresponding to a key manipulation detected from the user input unit 1435 or a signal corresponding to motion of the remote controller 1400, as sensed by the sensor unit 1440, to the image display device 1401.

In association with one or more embodiments, the remote controller 1400 may correspond to a user terminal necessary to execute a game application.

Accordingly, in association with gaming by the game application, a signal input through the user input unit 1435 of the remote controller 1400 is analyzed by the controller 1480 and is transmitted to the image display device through the wireless communication module 1425, thereby being applied to the played game. That is, the game may be played by controlling a card or a pointer displayed on the image display device.

In the embodiment, the remote controller may determine a distance between the image display device and the remote controller using the wireless communication module 1425 or the distance sensor (not shown). If the remote controller moves away from the image display device, a game main screen displayed on the image display device is enlarged and, if the remote controller approaches the image display device, the game main screen is reduced. Enlargement and reduction may be inversely controlled according to user setting.

In another embodiment, enlargement and reduction may be performed only when the distance between the remote controller and the image display apparatus is changed in a state in which a predetermined button of the remote controller 1400 is pressed.

Figure 15:
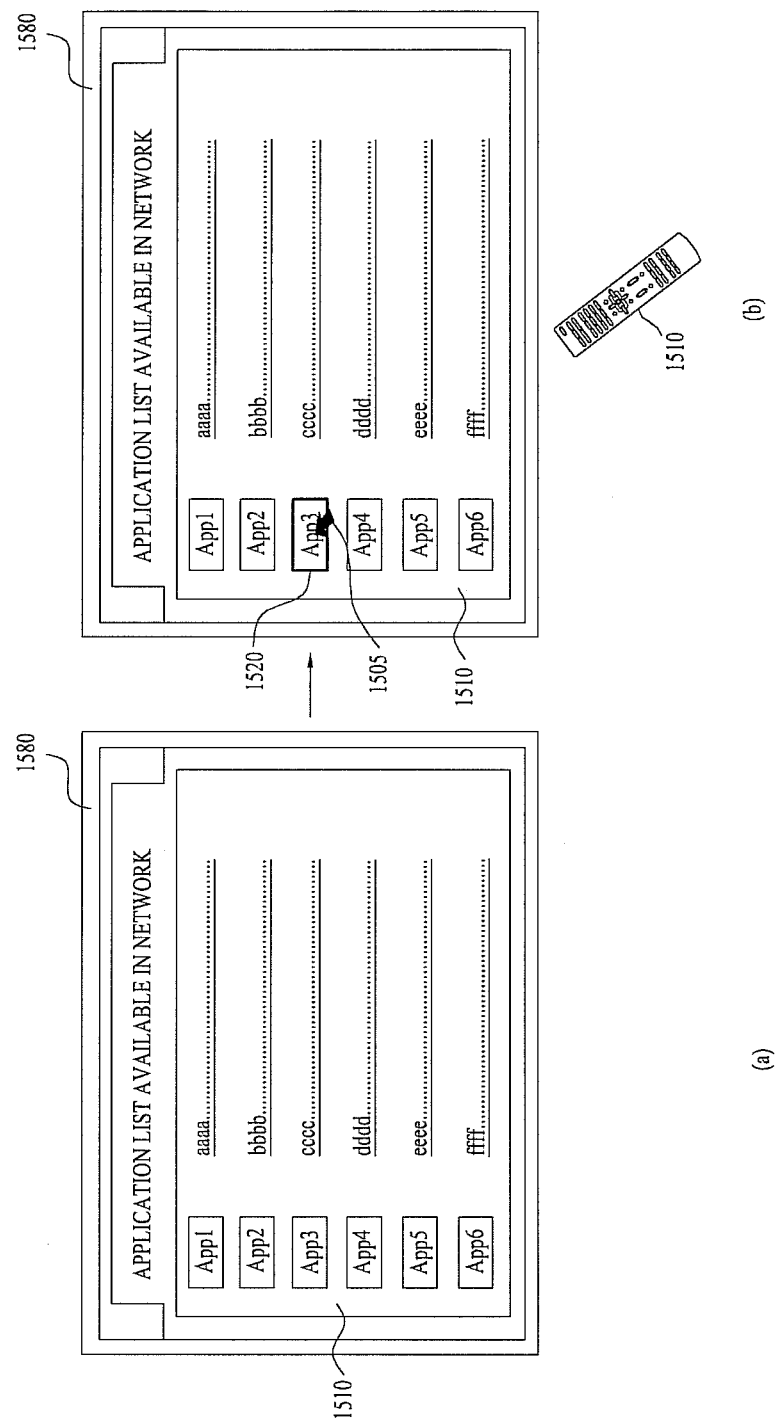
FIG. 15 shows a first embodiment of a user interface (UI) for an image display device.

FIG. 15 is a diagram showing a first embodiment of a UI in either of the image display devices according to embodiments.

Figure 16:
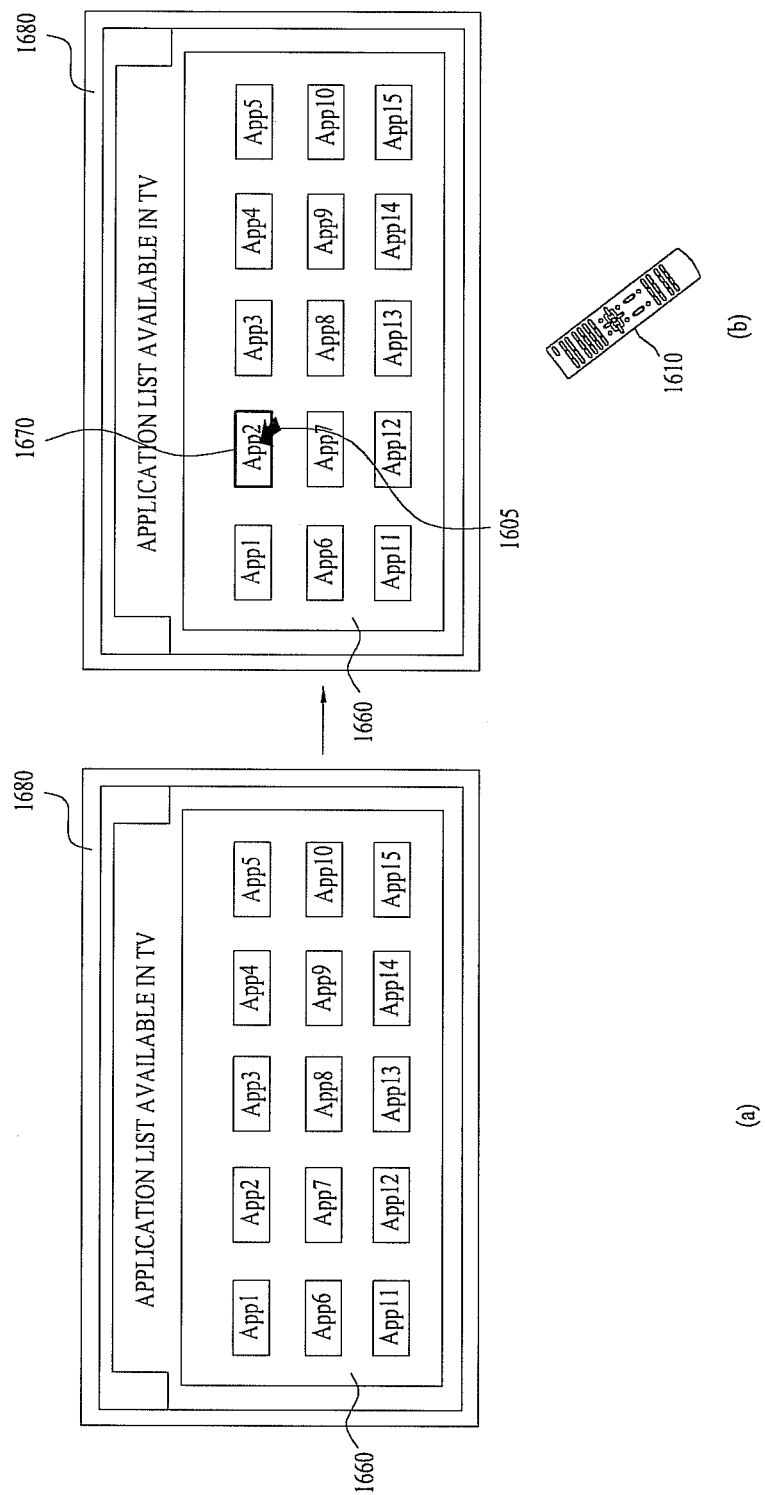
FIG. 16 shows a second embodiment of a UI for an image display device.

FIG. 16 is a diagram showing a second embodiment of a UI in either of the image display devices according to the embodiments.

Figure 17:
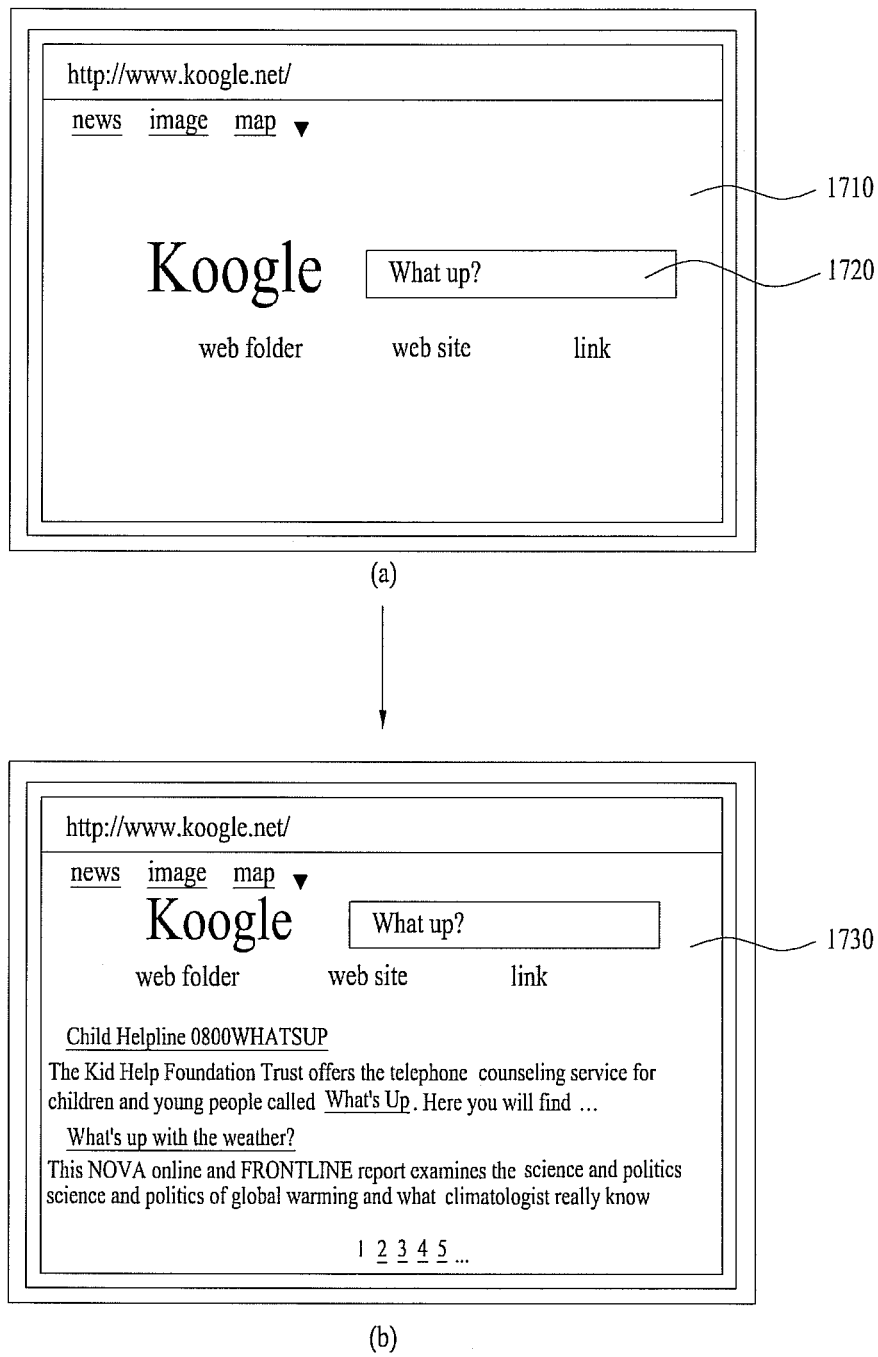
FIG. 17 shows a third embodiment of a UI for an image display device.

FIG. 17 is a diagram showing a third embodiment of a UI in either of the image display devices according to the embodiments.

FIG. 18 is a diagram showing a fourth embodiment of a UI in either of the image display devices according to the embodiments.

Referring to FIG. 15, an application list received over a network is displayed on the display 1580. A user may directly access a CP or an NP, search for various applications, and download the applications from the CP or the NP.

Specifically, FIG. 15(*a*) illustrates an application list 1510 available in a connected server, displayed on the display 180. The application list 1510 may include an icon representing each application and a brief description of the application. Because each of the image display devices according to the embodiments is capable of full browsing, it may enlarge the icons or descriptions of applications received from the connected server on the display 1580. Accordingly, the user can readily identify applications.

FIG. 15(*b*) illustrates selection of one application 1520 from the application list 1510 using the pointer 1505 of the remote controller 1510.

Thus, the selected application 1520 may be easily downloaded.

In association with one embodiment, a game application may be included in the application list 1510.

The game application included in the application list 1510 may include a game application for performing a game play process and providing a display screen to the image display device and a game application for performing a user control function necessary to play a game.

Accordingly, a user may select a game application according to one embodiment from the application list 1510 and download the game application to the image display device or the user terminal.

FIG. 16 illustrates an application list of the image display device, displayed on the display 1680. Referring to FIG. 16(*a*), when the user selects an application list view menu by manipulating the remote controller 1610, a list of applications 1660 stored in the image display device according to each of the embodiments is displayed on the display 1680. While only icons representing the applications are shown in FIG. 16, the application list 1660 may further include brief descriptions of the applications, like the application list illustrated in FIG. 15. Therefore, the user can readily identify the applications.

FIG. 16(*b*) illustrates selection of one application 1670 from the application list 1660 using the pointer 1205 of the remote controller 1610. Thus, the selected application 1670 may be easily executed.

While it is shown in FIG. 16 that the user selects a desired item by moving the pointer 1605 using the remote controller 1610, the application may be selected in many other ways. For example, the user may select a specific item using a cursor displayed on the screen by combined input of an OK key and a direction key of a local key (not shown) or the remote controller 1610.

In another example, if the remote controller has a touch pad, the pointer 1605 moves on the display 1680 according to touch input of the touch pad. Thus the user may select a specific item using the touch-based pointer 1605.

FIG. 17 illustrates a Web page displayed on the display of the image display device.

Specifically, FIG. 17(*a*) illustrates a Web page 1710 with a search window 1720, displayed on the display. The user may enter a character into the search window 1720 by use of character keys (not shown) of a keypad displayed on a screen, character keys (not shown) of local keys, or character keys (not shown) of the remote controller.

FIG. 17(*b*) illustrates a search result page 1730 having search results matching a keyword entered into the search window, displayed on the display.

Since the image display devices according to the embodiments are capable of fully browsing a Web page, the user can easily read the Web page.

FIG. 18 illustrates another Web page displayed on the display.

Specifically, FIG. 18(*a*) illustrates a mail service page 1810 including an ID input window 1820 and a password input window 1825, displayed on the display. The user may enter a specific numeral and/or text into the ID input window 1820 and the password input window 1825 using a keypad (not shown) displayed on the mail service page, character keys (not shown) of local keys, or character keys (not shown) of the remote controller. Hence, the user can log in to a mail service.

FIG. 18(*b*) illustrates a mail page displayed on the display, after a user logs in to the mail service. For example, the mail page may contains items "read mail", "write mail", "sent box", "received box", "recycle bin", etc. In the "received box" item, mail may be ordered by sender or by title.

The image display devices according to the embodiments are capable of full browsing when displaying a mail service page. Therefore, the user can conveniently use the mail service.

Figure 19:
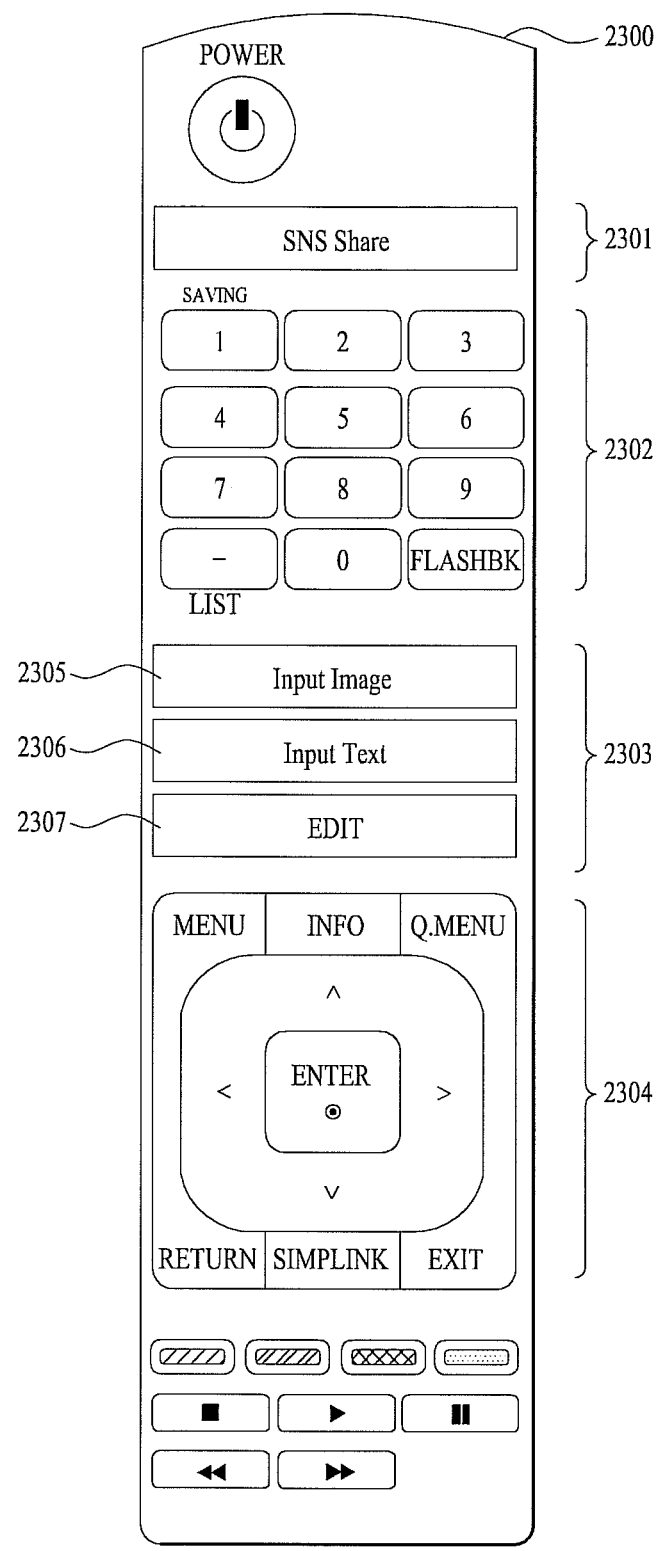
FIG. 19 shows a detailed view of a remote controller for a display device.

FIG. 19 illustrates a remote controller 2300 of the display device according to an embodiment. According to one embodiment, the remote controller 2300 may include an SNS Share key 2301, a number key pad 2302, a message input keypad 2303, and a direction key pad 2304.

While using a predetermined set of contents or services through the image display device, the user may input a command by using the SNS Share key 2301 (i.e., push the SNS Share key 2301) so as to input a signal for calling an Input Message window for inputting a message that is requested to be shared via SNS. The Input Message window respective to the input of the SNS Share key 2301 will be described in more detail later on with reference to FIG. 23.

The message input keypad 2303 may include an Input Image key 2305, an Input Text key 2306, and an Edit key 2307. When the user selects the Input Text key 2306, the image display device displays a list of recommended phrases or sentences, so that the user can easily input the required command phrase. The list of recommended phrases will be described in detail later on with reference to FIG. 24. Also, when the user selects the Input Image key 2305, the image display device displays a list of recommended images, so as to enable the user to easily input the wanted image. The list of recommended images will be described in detail later on with reference to FIG. 25. Furthermore, when the user selected the Edit key 2307, the image display device displays an Edit menu for editing the list of recommended phrases or list of recommended images. The Edit menu will be described in detail later on with reference to FIG. 32.

Additionally, by using the number key pad 2302 and the direction key pad 2304, the user may perform basic operations such as changing channels, selecting menus, and so on. According to one embodiment, when the list of recommended phrases or list of recommended images is displayed, a select signal for selecting any one of the phrases or images included in the displayed list may be inputted. More specifically, by using the remote controller shown in FIG. 19, the user may input a wanted message, so as to share the inputted message with other users via SNS. According to the other embodiment of the present invention, the remote controller 2300 further has a keyboard (ex: alphabet A to alphabet Z). For example, the keyboard is designed to use a qwerty-type.

Figure 20:
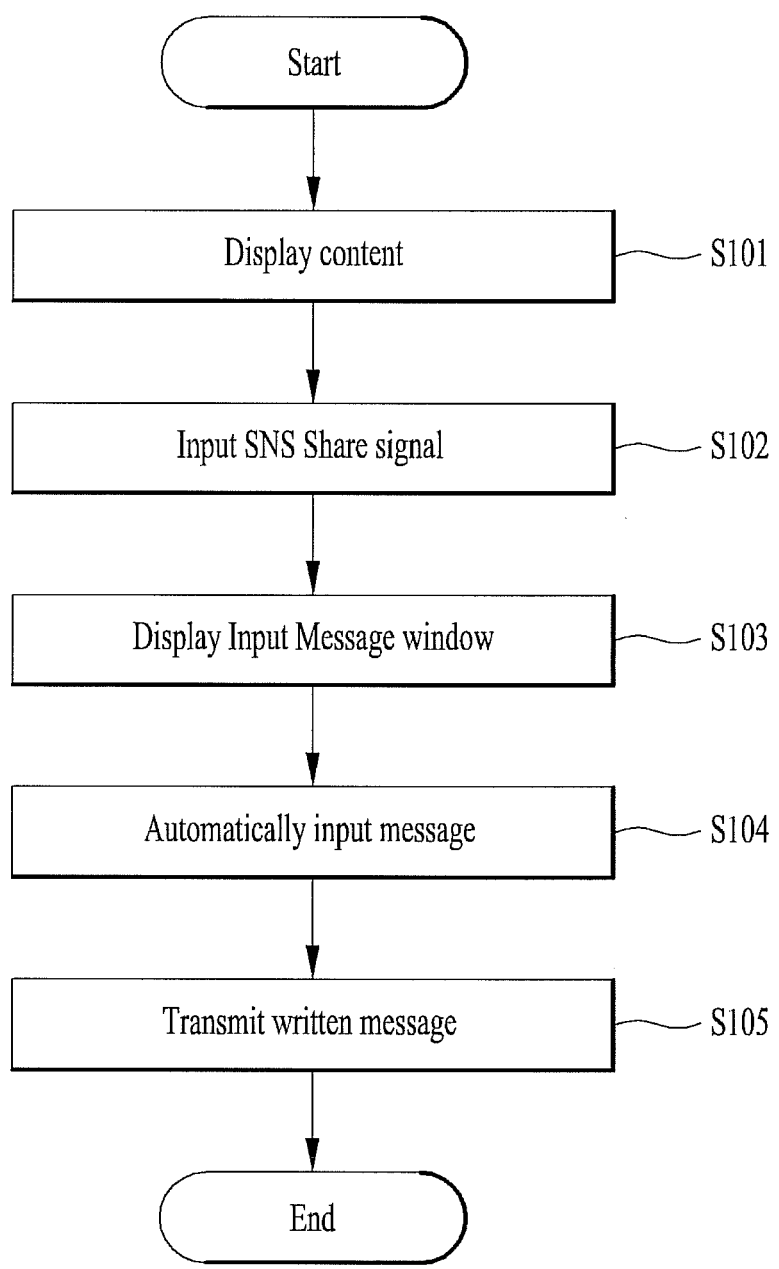
FIG. 20 shows one embodiment of a process for inputting a message to be shared via a social networking system (SNS) in an image display device.

FIG. 20 illustrates a flow chart showing a process of inputted a message that is to be shared via SNS in the image display device according to an embodiment. Referring to FIG. 20, the image display device provides contents to the user by displaying the provided contents on the image display device (S101). Herein, the contents may include all types of contents or services available to the image display device, such as broadcast contents, web contents, game contents, and so on. Thereafter, while the content is being displayed, the image display device detects an input of an SNS Share signal, which is inputted by the user (S102). Herein, the SNS Share signal may include an SNS Share key input signal or a select signal of a Share menu item displayed on the display screen. According to other embodiment of the present invention, S103 step automatically performs if a user selects s specific icon on TV screen even though the program related to SNS does not perform yet. According to another embodiment of the present invention, S103 step automatically performs if a user pushes a specific button on a remote controller even though the program related to SNS does not perform yet. Subsequently, when the input of the SNS Share signal is detected, the image display device displays an Input Message window (S103). Herein, the Input Message window corresponds to an input window configured to input a message that is requested by the user to be shared via SNS. More specifically, by inputting a predetermined text or image in the Input Message window and by inputting a verification signal (or OK signal), the user may upload the inputted message to an SNS server, thereby sharing the uploaded message with other users.

Thereafter, the image display device automatically inputs a message in the displayed Input Message window (S104). More specifically, before the user performs the operation of inputting the message, specific phrases or sentences may be automatically inputted so as to promote user convenience. This process will be described in more detail later on with reference to FIG. 21. Thus, users need not input information on which contents the users are viewing. For example, the image display device automatically inputs a message related to "XYZ drama" in the displayed Input Message window if the users are viewing the "XYZ drama". Furthermore, the image display device automatically inputs a message related to "MLB baseball" in the displayed Input Message window if the users are viewing the "MLB baseball" news.

Subsequently, the image display device transmits the inputted message through the network so as to upload the inputted message to an SNS server (S105). When the user completes the process of inputting a text or image in the Input Message window, the image display device transmits the inputted message to an SNS server through the network. Thus, the user may share the inputted message with other users via SNS. According to other embodiment of the present invention, the image display device displays selectable options on whom the inputted message is to be transmitted to, after performs S105 step.

Additionally, according to one embodiment, the image display device may receive user information (i.e., ID) and a respective password from the user so as to log-in to the corresponding SNS website. Also, according to one embodiment, when the user completes the process of inputting the text or image, the image display device displays a Select SNS menu for transmitting the inputted message. Then, when at least one or more SNS provider is selected from the Select SNS menu, the image display device may input the inputted message to a server belonging to the selected SNS. Furthermore, according to one embodiment, the Select SNS menu may include and display only Select menu items corresponding to SNS providers having pre-stored log-in information. Accordingly, by performing the above-described process step, the user may conveniently and correctly input a wanted message, thereby being capable of sharing the corresponding message with other users via SNS.

Figure 21:
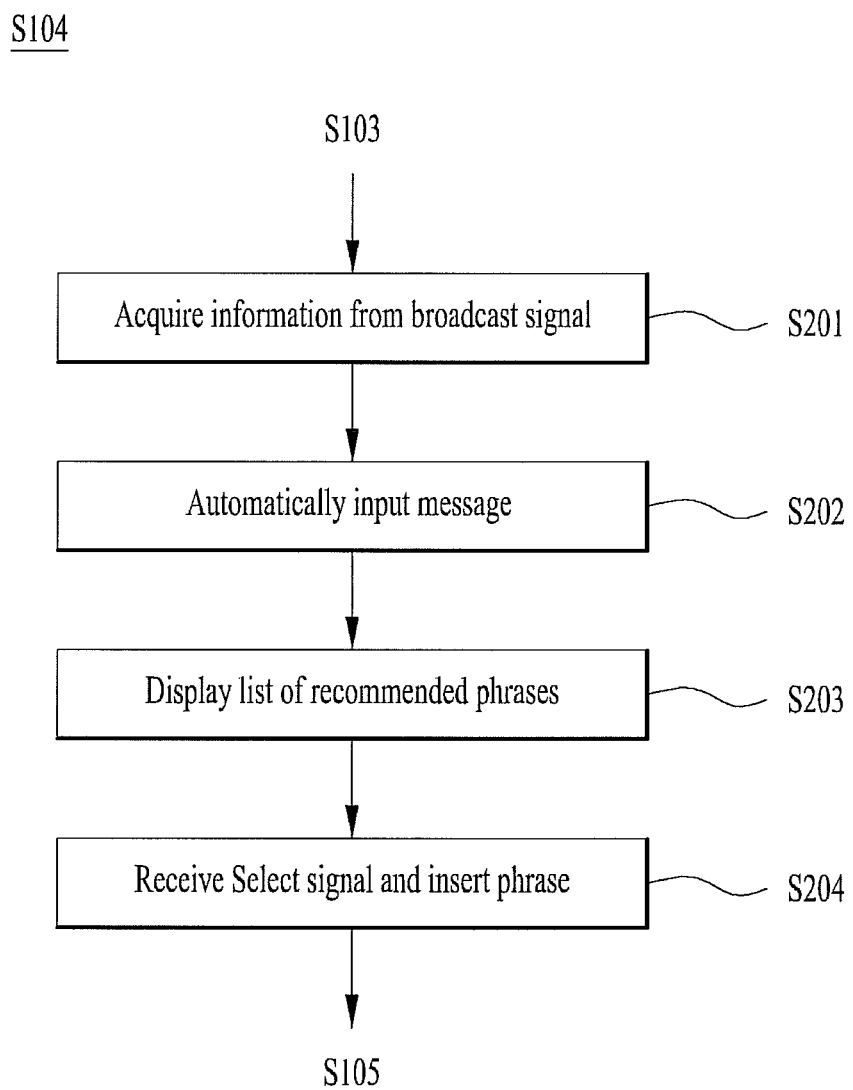
FIG. 21 shows one embodiment of a process of automatically inputting the message in FIG. 20.

FIG. 21 illustrates a flow chart showing a process of automatically inputting the message shown in FIG. 20. According to this embodiment, when an Input Message window is displayed, the image display device searches for a broadcast signal and additional data of a content, which is currently being used by the image display device, so as to acquire information related to the content that is currently being used (S201).

Herein, the image display device may use diverse types of contents, such as broadcast contents, game contents, web contents, and so on. And, if the content that is currently being used by the image display device corresponds to a broadcast content, the image display device searches for electronic program guide (EPG) information being included in a broadcast signals of the broadcast content, so as to acquire program information, such as the program name, airing time (or broadcasting time), broadcast station information, main actor/actress information. Furthermore, if the content that is currently being used by the image display device corresponds to a game content, the image display device may receive information on the game name, game producer (or production company), and so on from a service provider (SP) of the corresponding game content.

Subsequently, among the received or acquired information, the image display device automatically inputs a predetermined text or image in an Input Text window (or Input Message window) (S202). According to one embodiment, the inputted text or image may correspond to a text or image configured by extracting only the main information from the information searched in step S201. More specifically, the image display device may automatically select and input main information from the received or acquired information. And, once the user has stored set-up details (or user settings) on the main information, the image display device may select and input only the information corresponding to the stored set-up details (or user settings). Furthermore, the image display device may analyze the input operation of the user, so as to input information related to the frequently inputted information as the main information.

Thereafter, the image display device displays a list of recommended phrases (or sentences) (S203). According to one embodiment, the list of recommended phrases (or sentences) corresponds to a list including specific phrases (or sentences) mapped to predetermined numbers. Herein, the list may be configured of specific phrases or sentences stored by the manufacturer during the manufacturing of the image display device, or the list may be configured of phrases or sentences that are inputted and stored by the user, or the list may be configured of frequently used phrases or sentences determined by the image display device by analyzing the phrase or sentence inputting operation performed by the user. This will be described in more detail later on with reference to FIG. 24.

Additionally, instead of being mapped to numbers, the phrases or sentences may be mapped to letters (or characters) or signs that are related to input values of keys that can be inputted by the user by using the remote controller. More specifically, by mapping a sentence or phrase to a specific direction key, and when the user input the specific direction key, the mapped phrase may be inputted. Moreover, according to one embodiment, instead of the list of recommended phrases (or sentences), a list of recommended images may also be displayed. This will be described in more detail later on with reference to FIG. 25.

When the list of recommended phrases or the list of recommended images is displayed, the user may input a predetermined key so as to insert a specific phrase (or sentence) (S204). According to one embodiment, the user refers to the list of recommended phrases or the list of recommended images so as to input a specific number key or local key. Thus, the user may select a wanted phrase (or sentence) or image and input the selected phrase (or sentence) or image. More specifically, by performing this process, by inputting the wanted phrase or image, the user may write a message that he or she wishes to share via SNS, without having to perform a separate process of inputting a phrase or image.

Figure 22:
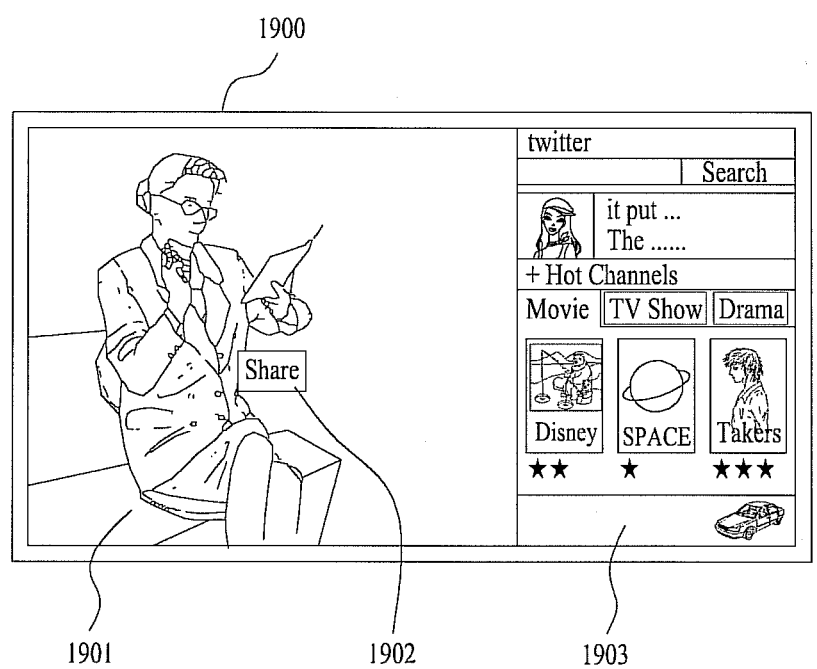
FIG. 22 shows one example of a display screen that includes a menu item for calling an Input Message window.

FIG. 22 illustrates a display screen including a menu item for calling an Input Message window. According to this embodiment, the image display device displays a display screen 1901 configured to provided a predetermined content to the user through the image display device. And, the image display device may also display an SNS menu 1903 in a predetermined display area of the image display device. The SNS menu 1903 corresponds to a menu, which is displayed on the image display device when an application for using a social network service (SNS) is being executed. Herein, the SNS menu 1903 may include a text or image provided via SNS in a predetermined display area of the image display device.

More specifically, for example, as shown in FIG. 22, when the user executes an application for using the "Twitter" service, which is one of the most widely used SNS, an SNS menu may be displayed. Herein, the SNS menu may include messages, channel program information, advertisement banners, and so on, which are provided by the "Twitter" service. Additionally, it will be apparent to anyone skilled in the art that, depending upon diverse types of SNS other than the "Twitter" service, such as "Facebook" or "MySpace", different types of information may be included and displayed in the SNS menu.

Also, the display screen may include a Share menu item 1902 for sharing messages. Herein, the Share menu item 1902 may always be displayed in a predetermined area of the display screen. Alternatively, in order to prevent the viewing of display screen 1902 of the content, which is currently being used by the image display device, from being interrupted, the Share menu item 1902 may be displayed only when the SNS menu 1903 is displayed, or the Share menu item 1902 may be displayed only when the user pushes a specific key on the remote controller.

Therefore, while the user is being provided with a broadcast content 1901 through the image display device, when the broadcast content 1901 includes details, which the user wishes to share with other users via SNS, and when the user inputs a select signal of the Share menu item 1902, the image display device may display an Input Message window. The Input Message window will be described in more detail later on with reference to FIG. 23 to FIG. 26.

FIG. 23 illustrates a display screen 2000 including an Input Message window. According to this embodiment, when the image display device receives a select signal of a predetermined menu item or an Input Hot Key signal through the remote controller of the image display device, the image display device may display an Input Message window 2002 being configured to input a message, which the user wishes to share with other users via SNS. Also, the Input Message window 2002 may include a thumbnail screen 2004 of the content that is currently being used by the image display device and an arbitrary phrase 2003 related to the currently used content.

Herein, the arbitrary phrase 2003 related to the currently used content may include information on the content, which is currently being used by the user through the image display device. More specifically, for example, when the user is currently viewing or using a broadcast content, the image display device searches for an electronic program guide (EPG), which is included in the broadcast signal, so as to extract main information related to the broadcast content. Thereafter, the user may input the extracted main information in the Input Message window 2002. Herein, the main information may include information on the program name, the broadcast station name, the program genre, and so on. Also, the user may store in advance set-up details (or user settings) related to the main information, which is extracted from the EPG. Then, the image display device may extract only the information respective to the pre-stored set-up details, so that the user can input the corresponding information in the Input Message window 2002.

The thumbnail screen 2004 corresponds to a predetermined set of image data, which may include image data configured by cropping a predetermined area of the image that is currently being displayed. If the corresponding content is a broadcast content, a thumbnail image included in the EPG may be searched and included in the thumbnail screen 2004. Also, the thumbnail screen 2004 may include diverse images, such as a predetermined area (or portion) of the content that is currently being used, a broadcast station logo image of the broadcast content that is currently being used, an icon image related to the content that is currently being used.

More specifically, without having to perform a separate input operation, the user may input text data and image data related to the content that is currently being used in an SNS, thereby enabling the user to easily share the inputted text data and image data with other users. Furthermore, the Input Message window 2002 may be displayed to overlay the display screen of the content that is currently being used, as shown in FIG. 23(*a*). Or, the Input Message window 2002 may be displayed to overlay a Home screen for executing an application, as shown in FIG. 23(*b*).

Figure 24:
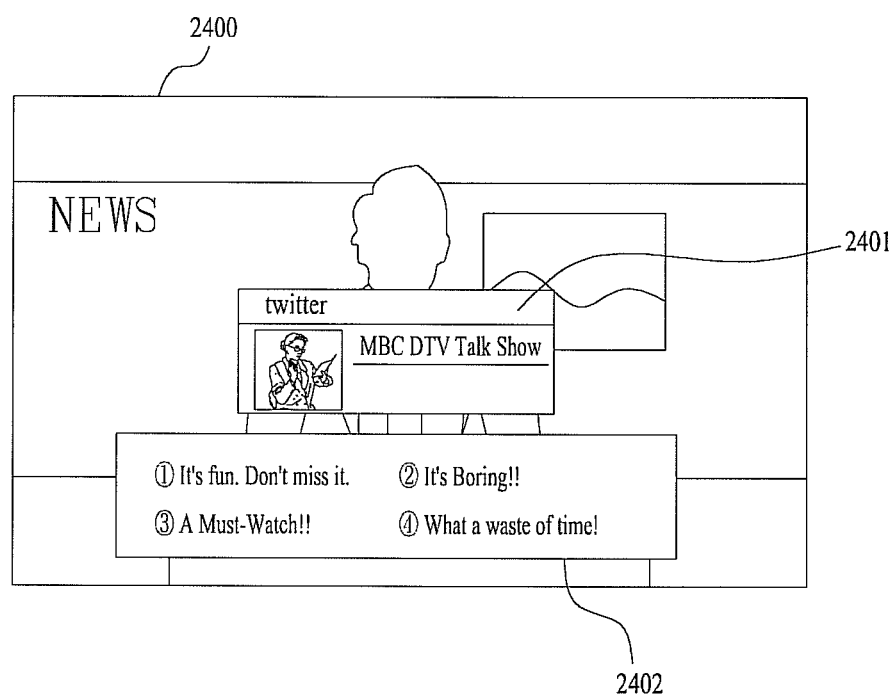
FIG. 24 shows another embodiment of a display screen including an Input Message window.

FIG. 24 illustrates a display screen 2400 including an Input Message window. According to this embodiment, the image display device may display a list of recommended phrases (or sentences) 2402 along with an Input Message window 2401. Herein, the list of recommended phrases (or sentences) 2402 corresponds to a list including arbitrary phrases (or sentences) mapped to predetermined numbers. For example, referring to FIG. 24, the user may recognize that 'It's fun. Don't miss it.' is mapped to number '1', that 'It's Boring!!' is mapped to number '2', that 'A Must-Watch!!' is mapped to number '3', and that 'What a waste of time!' is mapped to number '4'.

Also, when the image display device receives a predetermined number key input signal inputted by the user, the image display device inputs the phrase corresponding to the number of the received input signal in the Input Message window 2401. More specifically, for example, when the user inputs an input signal of number key '1', the respective phrase 'It's fun. Don't miss it.' is inputted to the Input Message window 2401.

Herein, the list of recommended phrases (or sentences) 2402 may be configured of specific phrases or sentences stored by the manufacturer during the manufacturing of the image display device, or the list of recommended phrases (or sentences) 2402 may be configured of phrases or sentences that are inputted and stored by the user, or the list of recommended phrases (or sentences) 2402 may be configured of frequently used phrases or sentences determined by the image display device by searching for the user's SNS usage pattern.

Additionally, the list of recommended phrases (or sentences) 2402 may be configured by having the image display device search the EPG of the content, which is currently being used currently used content. According to one embodiment, without having to input the number key, the user may select a specific phrase by using a pointer or a selection bar, so as to input the selected phrase to the Input Message window. Therefore, without having to perform a complex process of inputting a long series of letters (or characters) from the image display device, the user may easily input the required phrase by simply inputting the respective number key or direction key.

Figure 25:
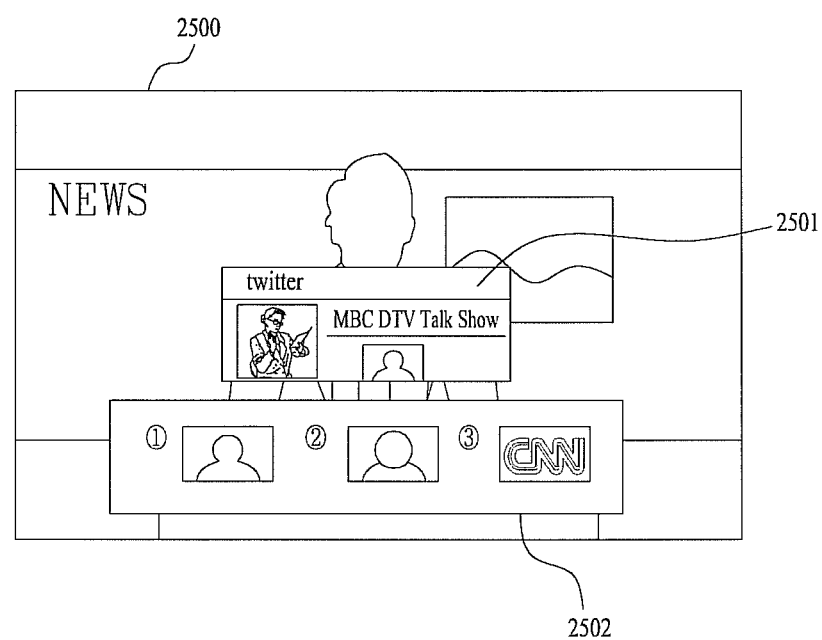
FIG. 25 shows an embodiment of a display screen including a Select Image window.

FIG. 25 illustrates a display screen 2500 including an image selection window. According to this embodiment, the image display device may display a list of recommended images 2502 along with the Input Message window 2501. Herein, the list of recommended images 2502 corresponds to a list of arbitrary image being amped to specific numbers.

Referring to FIG. 25, it may be recognized that image data corresponding to actor A starring in the content, which is currently being used in the image display device is mapped to number '1', that image data corresponding to actor B starring in the current content is mapped to number '2', and that image data corresponding to a logo of the current content is mapped to number '3'.

Also, when the image display device receives a predetermined number key input signal, which is inputted by the user, the image display device inputs an image respective to the number of the received input signal in the Input Message window 2501. More specifically, for example, when the user inputs the number key '2', image data corresponding to actor B starring in the content, which is currently being used in the image display device, is inputted to the Input Message window 2401.

Moreover, based upon the EPG information of the content that is currently being used by the image display device, the list of recommended images 2502 may be configured by searching a database related to image data, or the list of recommended images 2502 may be configured of specific images stored by the manufacturer during the manufacturing of the image display device, or the list of recommended images 2502 may be configured of images that are inputted and stored by the user, or the list of recommended images 2502 may be configured of images, which are frequently inputted by the user, the images being determined by the image display device by searching the user's SNS usage pattern.

Furthermore, according to one embodiment, without having to input the number key, the user may select a specific phrase by using a pointer or a selection bar, so as to input the selected image to the Input Message window. Therefore, without having to perform a complex process of inputting a long series of letters (or characters) from the image display device, the user may easily input the image, which the user wishes to share with other users, by simply inputting the respective number key or direction key.

Figure 26:
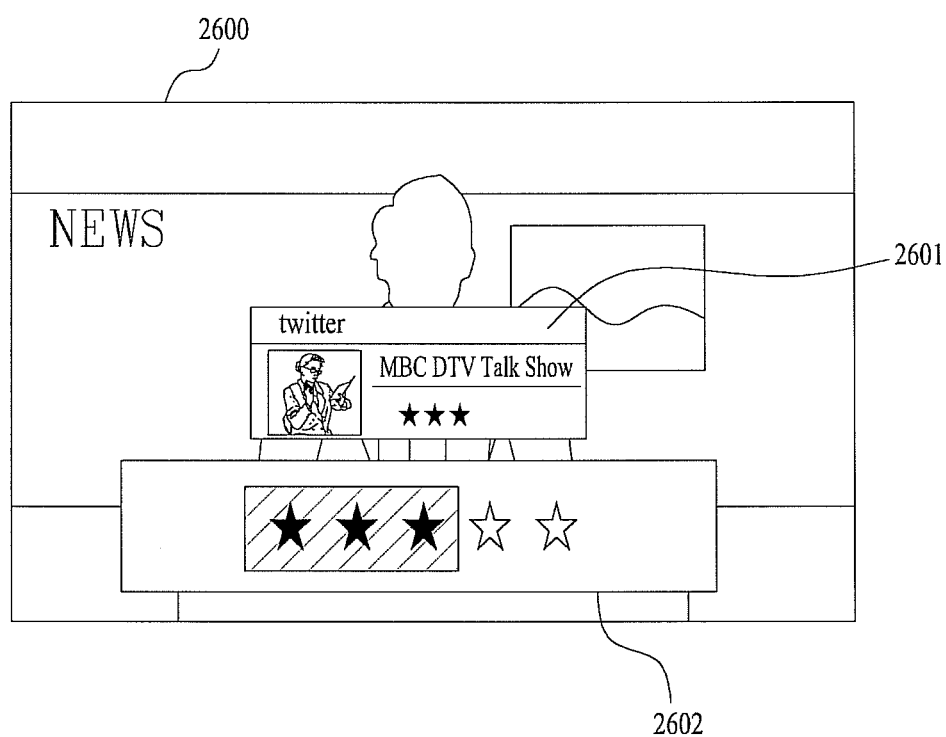
FIG. 26 shows an embodiment of a display screen including an Input Rating window.

FIG. 26 illustrates a display screen 2600 including an Input Rating window. According to this embodiment, the image display device may display an Input Rating window 2602 along with the Input Message window 2601. Herein, the user may input his or her rating on the content, which is currently being used in the image display device, through the Input Rating window 2602. More specifically, for example, as shown in FIG. 26, the Input Rating window 2602 includes a predetermined number of stars. The Input Rating window 2602 may receive a signal indicating the number of stars that will be inputted by the user to the Input Message window 2601.

Also, with respect to the inputted rating, an arbitrary phrase or sentence may be inputted in the Input Message window 2601 along with the rating. More specifically, for example, when the user selects five stars from the Input Rating window 2602, a phrase saying 'Recommended content' may be inputted to the Input Message window 2601 along with the five stars. Alternatively, when the user selects only one star from the Input Rating window 2602, a phrase saying 'Boring' may be inputted to the Input Message window 2601 along with the one star.

Furthermore, in order to input a signal indicating the number of stars that will be inputted by the user to the Input Message window 2601, the user may input numbers '1' to '5' from the remote controller or may use a selection bar or pointer, so as to select the number of stars that is to be inputted. Accordingly, the user may easily input his or her rating on the content that is currently being used, and the user may share the rating on the corresponding content with other users via SNS.

Figure 27:
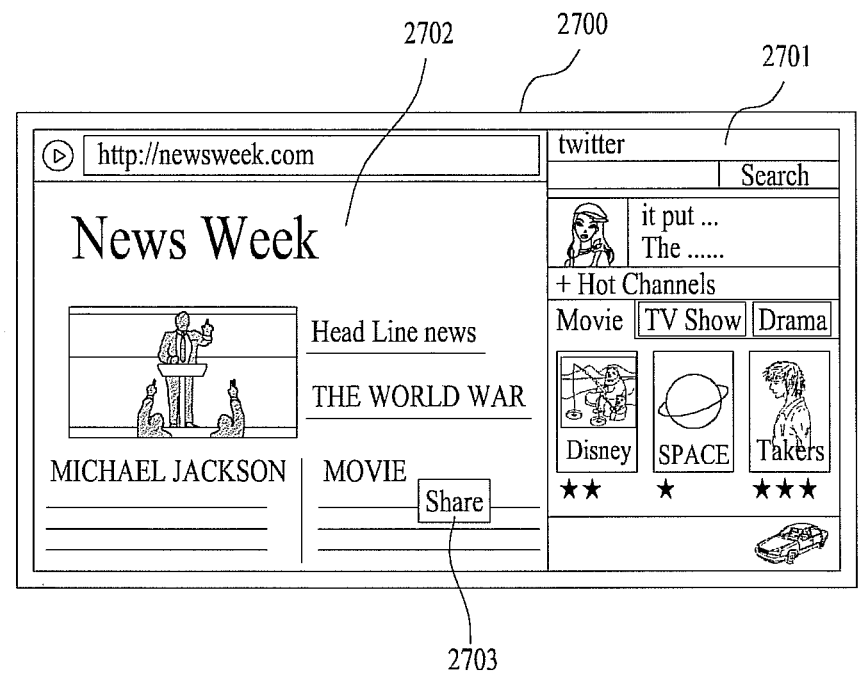
FIG. 27 shows illustrates a display screen including a menu item for calling the Input Message window.

FIG. 27 illustrates a display screen 2700 including a menu item for calling the Input Message window. According to this embodiment, the image display device may browse a webpage by executing a respective application. More specifically, referring to FIG. 27, the image display device may display a webpage 2702 on a display unit of the image display device. The image display device may also display an SNS menu 2701 along with the webpage 2702. Herein, the SNS menu 2701 is identical to the SNS menu 1903 of FIG. 22. Therefore, the description of the same will be omitted for simplicity.

The display screen of the image display device may also include a Share menu item 2703, such as the Share menu item 1902 shown in FIG. 22, which is configured to share messages. Herein, the Share menu item 2703 may be always displayed in a predetermined area of the display screen, or the Share menu item 2703 may be displayed only when the SNS menu 2701 is displayed or when the user pushes a specific key on the remote controller.

Therefore, while browsing the webpage 2702 through the image display device, when the user finds some information, which he (or she) wishes to share with other users, from the webpage 2702, the user may simply input a select signal of the Share menu item 2703, so as to display an Input Message window. The Input Message window will be described in more detail later on with reference to FIG. 28 and FIG. 29.

Figure 28:
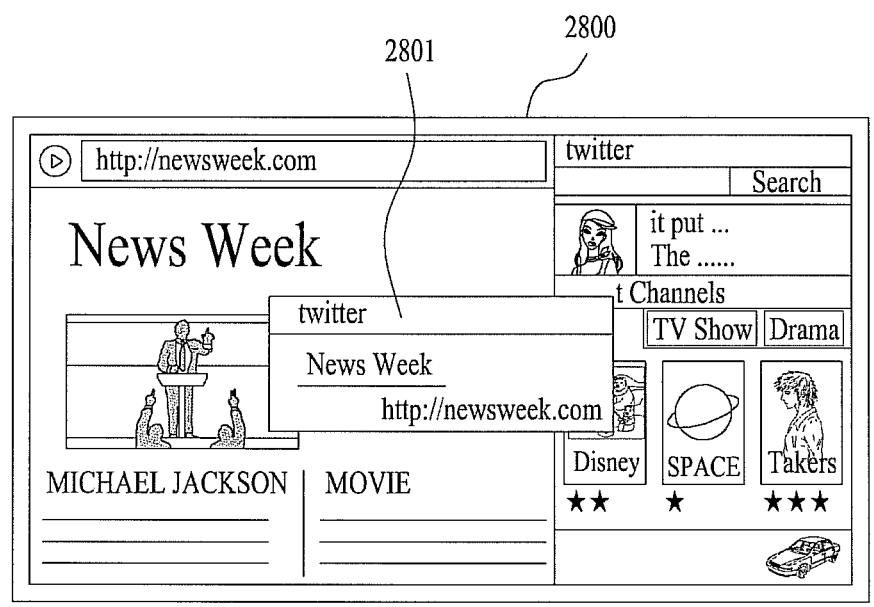
FIG. 28 shows another embodiment of a display screen including an Input Message window.

FIG. 28 illustrates a display screen 2800 including an Input Message window. According to this embodiment, when a select signal of the Share menu item is inputted by the user, the image display device may display an Input Message window 2801, which is configured to receive a message that is to be uploaded to an SNS server. More specifically, the image display device may receive a predetermined text or image through the Input Message window 2801. And, when an Input Completed signal is received from the user, the received message may be inputted and uploaded to the corresponding SNS server, so as to be shared with other users.

Also, if the content that is currently being used in the image display device corresponds to a webpage, the Input Message window 2801 may include a uniform resource locator (URL) including link information of a webpage that is currently being opened and used. Furthermore, according to one embodiment, if information on main webpage information is included in the webpage of the web content, which is currently being used in the image display device, based upon the information on the main webpage information, the main information is extracted from the webpage so as to be inputted to the Input Message window 2802.

According to another embodiment, words or terms most frequently repeated within the webpage, or words or terms written in the largest font within the webpage may be recognized as the main information. Accordingly, such main information may be inserted in the Input Message window 2801.

More specifically, the users who share the inputted message with the user of the image display device can be easily informed of an address of the webpage, which includes the content requested by the user to be shared with other users. Then, by selecting the corresponding URL, the respective webpage may be displayed on the display screen of the image display device.

Figure 29:
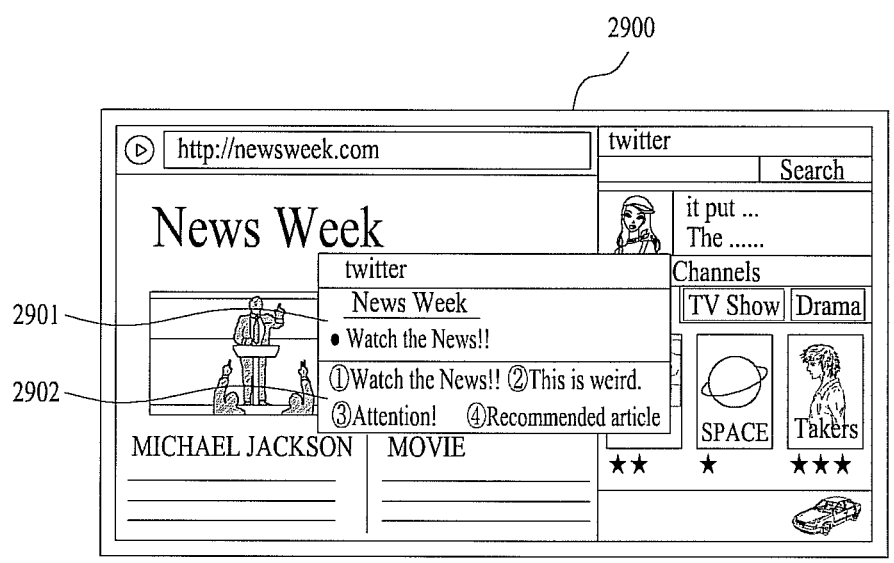
FIG. 29 shows another embodiment of a display screen including an Input Message window.

FIG. 29 illustrates a display screen 2900 including an Input Message window. According to this embodiment, the image display device may display an Input Message window 2901 configured to receive a message, which the user wishes to share with other users via SNS. And, the image display device may also display a list of recommended phrases (or sentences) 2902 along within the Input Message window 2901.

Herein, the list of recommended phrases (or sentences) 2902 may include a list of phrases mapped to arbitrary number keys. More specifically, for example, a phrase saying 'Watch the News' is mapped to '1', a phrase saying 'This is weird' is mapped to '2', a phrase saying 'Attention!' is mapped to '3', and a phrase saying 'Recommended article' is mapped to '4'. Then, when any one of 1, 2, 3, and 4 is inputted, the phrase respective to the inputted number may be inputted to the Input Message window 2901.

The list of recommended phrases (or sentences) 2902 may be configured of phrases or sentences inputted and stored by the manufacturer during the manufacturing of the image display device, or the list may be configured of frequently used phrases or sentences determined by the image display device by analyzing the usage pattern of the user, or the list may be configured by loading details stored in advance by the user. More specifically, by inputting a predetermined number key based upon the list of recommended phrases 2902, the user may be capable of easily inputting the wanted arbitrary phrase.

Figure 30:
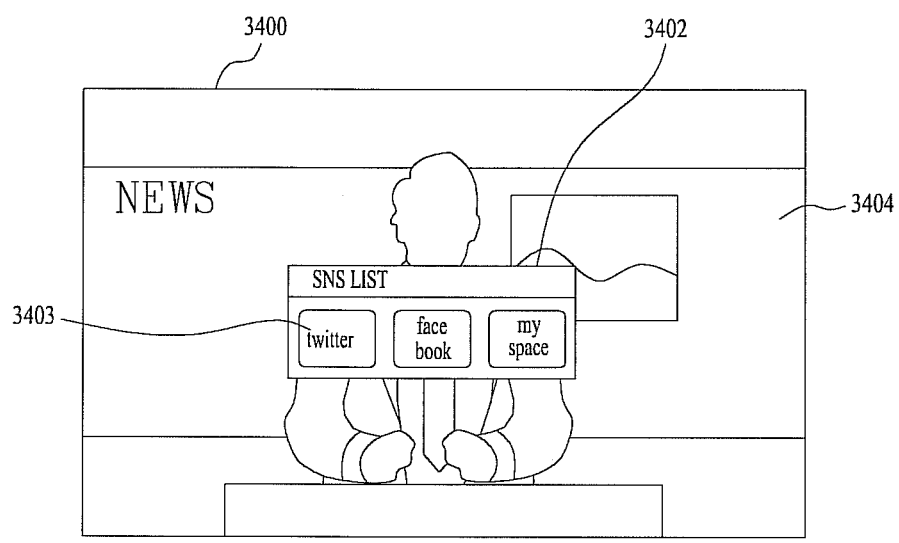
FIG. 30 shows a display screen including an SNS list.

FIG. 30 illustrates a display screen 3400 including an SNS list. According to this embodiment, one or more social network services (SNSs) may be available to a single image display device. Therefore, by searching for SNSs that are currently available to the image display device, and, based upon the searched result, the image display device may display an SNS list 3402 including Select SNS menu items 3403. Herein, according to one embodiment, the Select SNS menu items 3403 may include text information and image information on the name of the SNS website, the uniform resource locater (URL) of the SNS, the SNS icon, and so on, thereby being displayed.

Also, after searching for the network connections status of each SNS server, the image display device may display Select SNS menu items of the SNS capable of performing smooth data transmission and reception through the current network, in bold fonts, and the image display device may display Select SNS menu items of the SNS that cannot perform smooth data transmission and reception through the current network, in faded (or gray-scale) fonts. Accordingly, by referring to the SNS list 3402, the user may be capable of determining which SNS is currently available and acquires information on each SNS. Then, by selecting one or more SNSs, the user may be capable of transmitting a specific message, so that the transmitted massage can be shared with other users through the selected SNS.

Additionally, the SNS list 3402 may be displayed to overlay the display screen 3404 of the content that is currently being used in the image display device, and, in order to prevent the viewing of display screen 3404 of the content from being interrupted, the SNS list 3402 may be displayed in a predetermined area of the display screen or may be displayed in semi-transparent colors.

Figure 31:
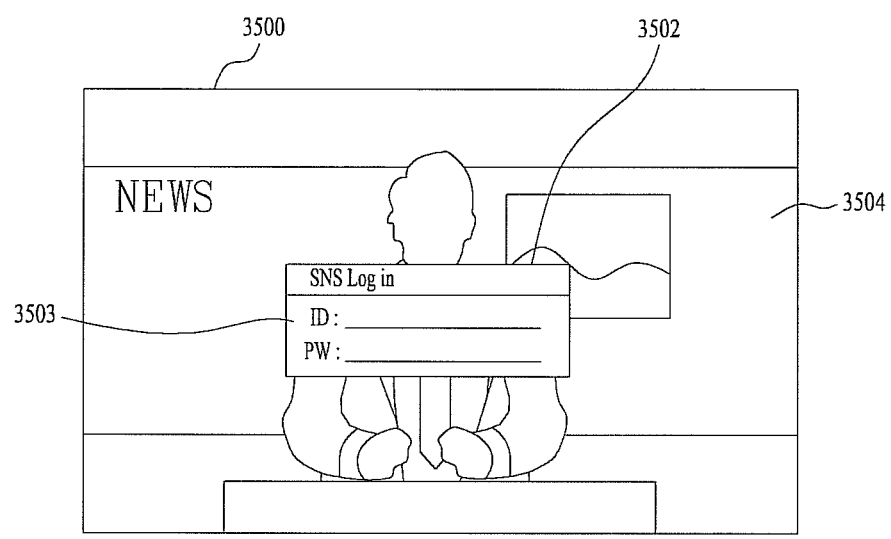
FIG. 31 shows a display screen having an Input User Information window.

FIG. 31 illustrates a display screen 3500 including an Input User Information window. According to this embodiment, when the user wishes to transmit an arbitrary message to a server through the image display device, the image display device may receive user information required for accessing the corresponding server.

More specifically, when the user wishes to share a specific message with other users via a social network service (SNS), the image display device may display an Input User Information window 3502 so as to receive user information, which is required for logging into the corresponding SNS server. Herein, the Input User Information window 3502 may include input items 3503 for receiving the user information requested by the SNS server. Generally, the input items may include a user identification (user ID) and password (PW).

Additionally, in case the user log-in information is pre-stored in the image display device, the image display device may display the Input User Information window 3502 having the ID and/or PW already inputted therein. Furthermore, in addition to the ID and/or PW, the input items may also include diverse authentication information, such as the user's E-mail address, an IP address of the image display device, a serial number of the image display device, and so on.

The Input User Information window 3502 may be displayed to overlay the display screen 3504 of the content that is currently being used in the image display device, and, in order to prevent the viewing of display screen 3504 of the content from being interrupted, the Input User Information window 3502 may be displayed in a predetermined area of the display screen or may be displayed in semi-transparent colors.

Figure 32:
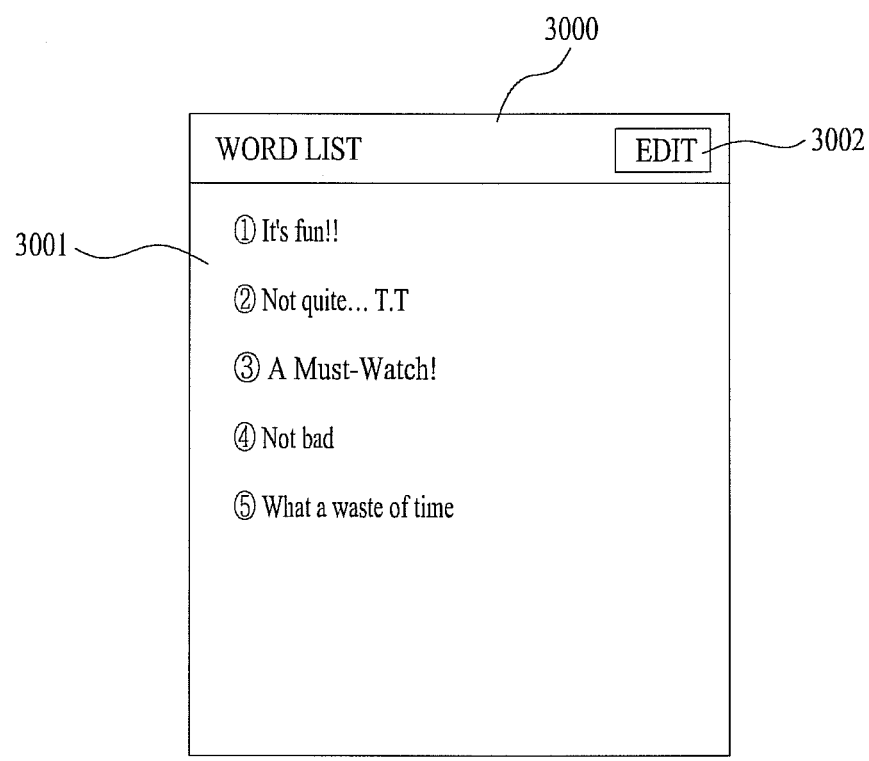
FIG. 32 shows a display screen including an Edit Message menu.

FIG. 32 illustrates a display screen including an Edit Message menu. According to this embodiment, the image display device may provide an Edit Message menu 3000 to the user, wherein the Edit Message menu 3000 is configured to edit the list of recommended phrases (or sentences) shown in FIG. 24 and FIG. 29.

More specifically, when the user inputs an Input Hot Key signal or a Select signal of a menu item for calling the Edit Message menu, the image display device may display the Edit Message menu 3000. Herein, the Edit Message menu 3000 may include a list of recommended phrases (or sentences) 3001 and an Edit menu item 3002. Herein, the list of recommended phrases (or sentences) 3001 may be configured by having specific designated phrases stored therein by the manufacturer during the manufacturing of the corresponding image display device. More specifically, before the shipping and delivery of the image display device, a small selection of phrases (or sentences) frequently used by users when inputting SNS messages may be selected and stored in the image display device.

Additionally, the list of recommended phrases (or sentences) 3001 may also include a list of phrases (or sentences) predetermined by the user. More specifically, the user may personally input and store phrases or sentences, which he (or she) uses most frequently when writing SNS messages, in the image display device. Furthermore, the list of recommended phrases (or sentences) 3001 may include and display numbers mapped to the phrases or sentences included in the list of recommended phrases (or sentences) 3001.

More specifically, by using the list of recommended phrases (or sentences) 3001, the user may be capable of easily determining which phrases or sentences are currently stored in the image display device and to which numbers the phrases or sentences are respectively mapped. When a Select signal of the Edit menu item 3002 is inputted by the user, the image display device may display a message for editing the list of recommended phrases (or sentences) 3001. This will now be described in detail with reference to FIG. 33.

Figure 33:
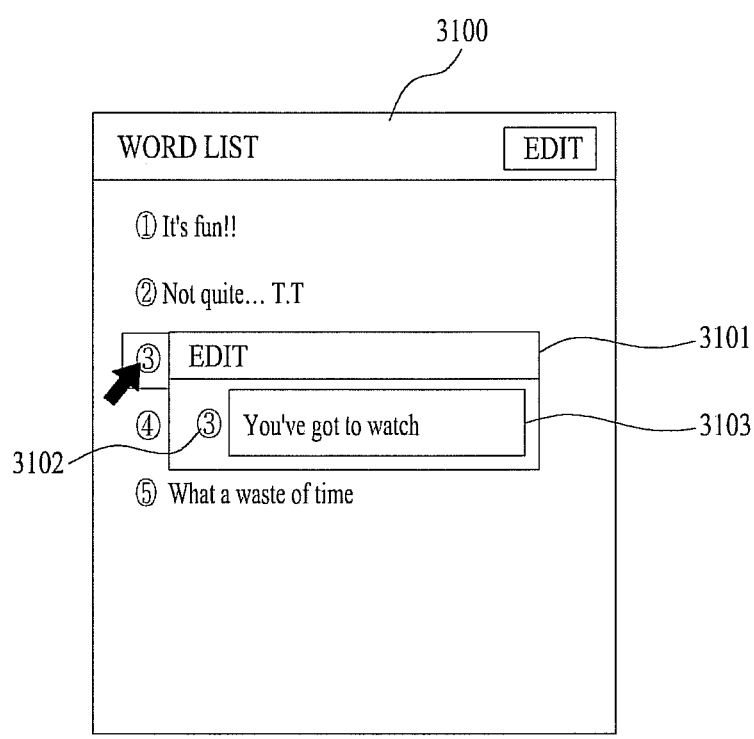
FIG. 33 shows a display screen including an Input Text window.

FIG. 33 illustrates a display screen 3100 including an Input Text window. When a Hot Key Input signal for editing the list of recommended phrases (or sentences) or a Select signal of a predetermined menu item is inputted by the user, the image display device may display an Input Text window 3101. The Input Text window 3101 corresponds to an input window for inputting a text. Herein, the Input Text window 3101 is included in the list of recommended phrases (or sentences), and the Input Text window 3101 may include information on a number 3102 mapped to the text (or phrase) that is being inputted and information on the text (or phrase) 3103 that is being inputted.

The number 3102 mapped to the text (or phrase) that is being inputted may vary depending upon the user's input. More specifically, when an arbitrary number key is inputted while the Input Text window 3101 is displayed, the mapped number 3102 may be changed to a number corresponding to the inputted arbitrary number key. The text (or phrase) 3103 that is being inputted may include information on the text that is being inputted by the user.

For example, when a virtual keyboard (not shown) is displayed on the display screen along with the Input Text window 3101, and when the user input a predetermined Select Text signal, the text corresponding to the inputted Select signal may be displayed as the text (or phrase) 3103 that is being inputted. Accordingly, while inputting the text, the user may check for any spelling errors.

Then, once the process of inputting the text is completed, the user may input a signal for storing the inputted text, and the image display device updates a database, wherein the list of recommended phrases (or sentences) is stored, so that the database of the image display device can include the newly inputted text (or phrase). Thereafter, the image display device updates the list of recommended phrases (or sentences) displayed on the display screen by applying the new information, thereby displaying the updated list of phrases.

Figure 34:
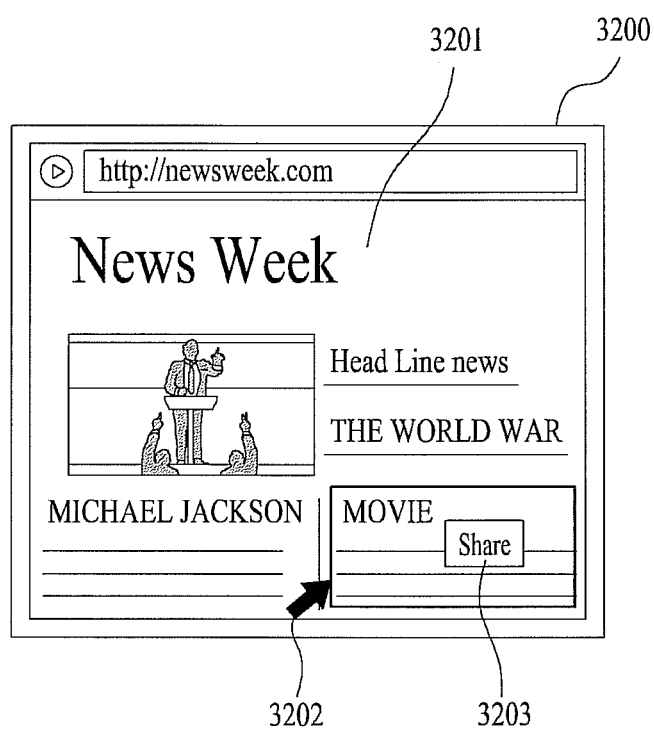
FIG. 34 shows a display screen sharing text of web content.

FIG. 34 illustrates a display screen 3200 sharing a text of a web content. According to this embodiment, a web content 3201 may be used by using the image display device, and, when a drag & drop operation is performed by using a predetermined pointer within the display screen where the corresponding web content 3201 is being displayed, a portion included in an arbitrary square may be shared by performing the drag & drop operation.

More specifically, according to one embodiment, when the user operates the pointer 3202 by using the remote controller, and when the user creates an arbitrary square by performing a Drag & Drop operation, the image display device may display a Share menu item 3203. And, when the user inputs a Select signal of the Share menu item, or when the user inputs an Input Hot Key signal, the details (or text) included in the arbitrary square may be inputted to the Input Message window of FIG. 28.

Furthermore, the details (or text) included in the arbitrary square may be inputted in a captured image format in the display screen displaying the current web contents. Then, after recognizing the text or image of the web content, the recognized text and image are converted to a suitable format so as to be inputted in the Input Message window. The input format may be decided by the user or may be automatically decided based upon the attributes of the web content.

Accordingly, while the user uses the corresponding web content, by performing a simple drag & drop operation, the user may share a wanted portion of the display screen with other users via SNS. Furthermore, it will be apparent that in addition to web content, FIG. 34 may also be applied to other cases where diverse contents can be displayed on the display screen of the image display device.

FIG. 35 shows one embodiment which involves the use of an EPG 3300. In this embodiment, when the image display device receives broadcast content from a broadcast station, the image display device may receive a broadcast signal of the broadcast content, wherein the broadcast signal includes a predetermined set of additional information.

Most particularly, the additional information may include an electronic program guide (EPG). As shown in FIG. 35, the EPG information may include the name of a broadcast station 3301 available to the image display device, and the EPG information may also include information on the program being provided from each broadcast station in accordance with a time schedule 3302.

Additionally, when the user selects a program name or a broadcast station name included in the EPG, the image display device may display Detailed Information 3303 on the selected program or broadcast station. Accordingly, the user may acquire information on the broadcast stations to which the diverse broadcast signals belong, information on which program is provided at what time by each broadcast station, information on each program name, and information on each airing time from the broadcast signal available to the image display device. The user may also acquire information on main actors, synopsis, program rating for parental viewing guidance, and so on from the EPG.

Furthermore, according to one embodiment, the image display device extracts specific information from the above-described EPG, so as to input main information in the Input Text window shown in FIG. 23. Accordingly, the user may easily input the predetermined set of information included in the EPG information without having to perform any additional operations. Moreover, the EPG information may be extracted from a broadcast signal by the OSD generator shown in FIG. 10. Herein, the OSD generator searches for main information from the extracted EPG information, so as to perform the operation for inputting messages or texts in the Input Text window of FIG. 23.

Figure 36:
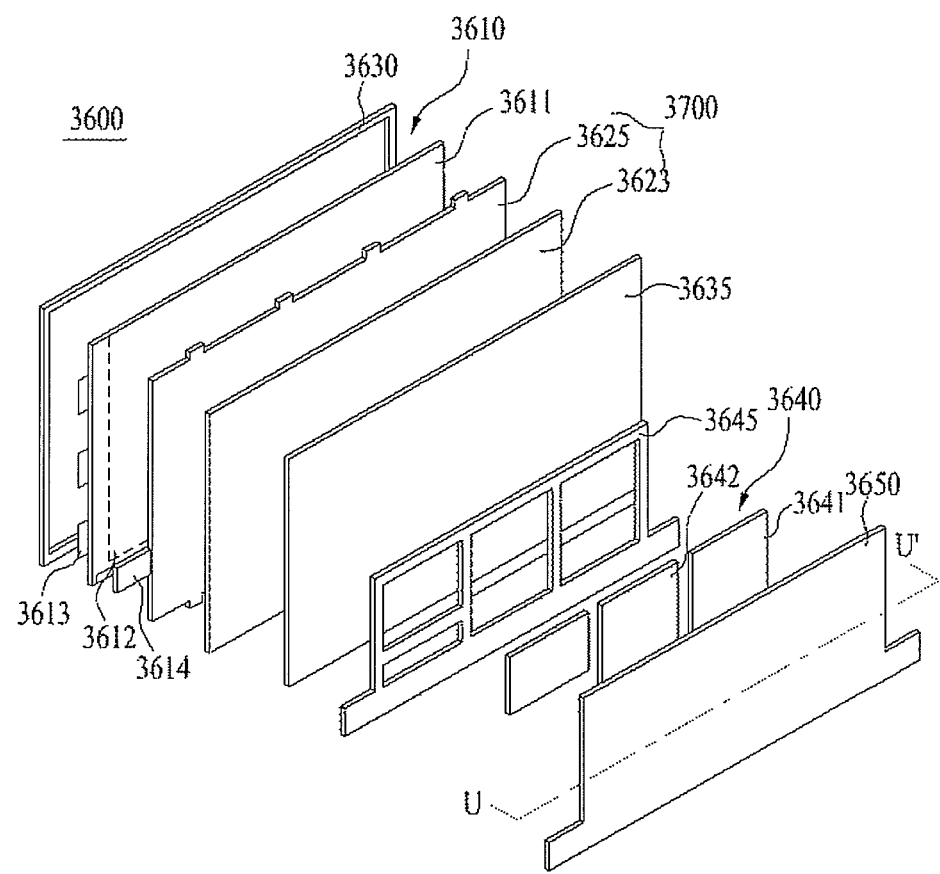
FIG. 36 shows a display device according to an exemplary embodiment of the invention.

FIG. 36 shows a display device according to an exemplary embodiment of the invention. As shown in FIG. 36, a display device 3600 according to an exemplary embodiment of the invention may include a display panel 3610, a backlight unit 3700, a cover 3630, a bottom plate 3635, a driver 3640, and a back case 3650. For example, a display device according to the present invention may use LED or OLED. Detail descriptions on the display device using the LED or OLED as follows.

The display panel 3610 is an image displaying element and may include a first substrate 3611 and a second substrate 3612 that are positioned opposite each other and are attached to each other with a liquid crystal layer interposed therebetween. Although it is not shown, a plurality of scan lines and a plurality of data lines may cross each other in a matrix form on the first substrate 3611 called a thin film transistor (TFT) array substrate, thereby defining a plurality of pixels. Each pixel may include a thin film transistor capable of switching on and off a signal and a pixel electrode connected to the thin film transistor.

Red (R), green (G), and blue (B) color filters corresponding to each pixel and black matrixes may be positioned on the second substrate 3612 called a color filter substrate. The black matrixes may surround the R, G, and B color filters and may cover a non-display element such as the scan lines, the data line, and the thin film transistors. A transparent common electrode covering the R, G, and B color filters and the black matrixes may be positioned on the second substrate 3612.

A printed circuit board (PCB) may be connected to at least one side of the display panel 3610 through a connection member such as a flexible circuit board and a tape carrier package (TCP), and the display panel 3610 may be closely attached to a back surface of the bottom plate 3635 in a module process.

When the thin film transistors selected by each scan line are switched on in response to an on/off signal that is transferred from a gate driving circuit 3613 through the scan lines, a data voltage of a data driving circuit 3614 is transferred to the corresponding pixel electrode through the data lines and an arrangement direction of liquid crustal molecules changes by an electric field between the pixel electrode and the common electrode. Hence, the display panel 3610 having the above-described structure displays an image by adjusting a transmittance difference resulting from changes in the arrangement direction of the liquid crustal molecules.

The backlight unit 3700 may provide light from a back surface of the display panel 3610 to the display panel 3610. The backlight unit 3700 may include an optical assembly 3623 and a plurality of optical sheets 3625 positioned on the optical assembly 3223. The backlight unit 3700 will be described later in detail.

The display panel 3610 and the backlight unit 3700 may form a module using the cover 3630 and the bottom plate 3635. The cover 3630 positioned on a front surface of the display panel 3610 may be a top cover and may have a rectangular frame shape covering an upper surface and a side surface of the display panel 3610. An image achieved by the display panel 3610 may be displayed by opening a front surface of the cover 3630.

The bottom plate 3635 positioned on a back surface of the backlight unit 3700 may be a bottom cover and may have a rectangular plate shape. The bottom plate 3635 may serve as a base element of the display device 3600 when the display panel 3610 and the backlight unit 3700 form the module.

The driver 3640 may be positioned on one surface of the bottom plate 3635 by a driver chassis 3645. The driver 3640 may includes a driving controller 3641, a main board 3642, and a power supply unit 3643. The driving controller 3641 may be a timing controller and controls operation timing of each of driving circuits of the display panel 3610. The main board 3642 transfers a vertical synchronous signal, a horizontal synchronous signal, and a RGB resolution signal to the driving controller 3641. The power supply unit 3643 applies a power to the display panel 3610 and the backlight unit 3700. The driver 3640 may be covered by the back case 3650.

As described above, the method for sharing messages in an image display device and the image display device for the same have the following advantages. According to an embodiment, by enabling the user to easily input a message, which the user wishes to share with other users via SNS, the processing speed and accuracy may be enhanced. In addition, since the image display device provides diverse user interfaces, the user convenience may also be enhanced. Furthermore, since the use of SNS by using the image display device is more simplified, active usage of SNS can be promoted.

Meanwhile, the method of operating the image display device may be realized as a code that can be read by a processor provided in the image display device in a recording medium that can be read by a processor. The recording medium that can be read by the processor includes all types of recording devices storing data that can be read by the processor. Examples of the recording media that can be read by a processor may include ROMs, RAMs, CD-ROMs, magnetic tapes, floppy disks, optical data storing devices, and so on.

Also, an exemplary recording medium being realized in the form of a carrier wave, such as a transmission via Internet, may also be included. Also, the recording medium that can be read by a processor may be scattered within a computer system, which is connected through a network. And, a code that can be read by the processor may be stored and executed by using a dispersion (or scattering) method.

In accordance with one or more embodiments described herein, the display apparatus may, for example, be an intelligent display apparatus equipped with a computer supporting function in addition to the broadcast program receiving function.

Accordingly, since the display apparatus is committed (or devoted) to its broadcast program receiving function and is also supplemented with an internet browsing function, the display apparatus may be equipped with an interface that can be more conveniently used as compared to an hand-writing type input device, a touch screen or a space remote controller.

Furthermore, being supported with a wired or wireless (or radio) internet function, the display apparatus may be connected to (or may access) the internet and a computer, thereby being capable of performing email transmission, web browsing, internet banking or gaming functions. In order to perform such variety of functions, the display apparatus may adopt a standardized OS for general purpose.

Accordingly, since a variety of applications may be easily added to or deleted from the display device within an OS kernel for general purpose, the display apparatus described in the description may, for example, be capable of performing a wide range of user-friendly functions. More specifically, examples of an image display device may include network TVs, HBBTVs, smart TVs, and so on, and, in some cases, smartphones may also be used as the image display device.

Accordingly, one embodiment disclosed herein corresponds to a method for sharing messages in an image display device and an image display device for the same.

Another embodiment provides a method for sharing messages in an image display device and an image display device for the same that can enhance user convenience by facilitating the process of inputting messages.

Another embodiment provides a method for sharing messages in an image display device and an image display device for the same that can provide diverse types of user interface.

Another embodiment provides a method for sharing messages of an image display device includes the steps of displaying an arbitrary content, receiving a Share Message signal, generating a message corresponding to the arbitrary content, and transmitting the generated message to a server through a network.

Another embodiment provides an image display device connectable to a network includes a user interface unit configured to receive a Share Message signal and a control signal of the image display device, a message generator configured to generate a message corresponding to an arbitrary content being used in the image display device, a network interface unit configured to transmit and receive data to and from an arbitrary server connected to the network, and a controller configured to display arbitrary contents and to transmit the generated message to the server.

Another embodiment provides a method for controlling display of information, comprising: displaying content on a first display device; receiving a signal to share information; generating a message including information corresponding to the displayed content, the message automatically generated in response to the signal; and transmitting the message for display on at least a second display device, wherein at least one of the first display device or the second display device is a television, wherein the message is transmitted to a provider of a network-related service and wherein the first and second display devices have access to the network-related service.

The content may be derived from at least one of a broadcast signal, a web page, a game, or a media provider, and the network-related service may be social network service (SNS) or another type of network (e.g., a web site having a blog, interactive chat, or other site that maintains a message board or other area for information exchange among users), and the first and second display devices have access to the SNS based on membership information.

If a social network, the method may further include displaying a menu of the SNS on the first display device, wherein the SNS menu is displayed simultaneously with the content. Also, the information corresponding to the displayed content in the message may automatically be obtained from an electronic program guide.

The method may further include displaying a list of predetermined words or phrases; receiving a selection of one of the predetermined words or phrases; and transmitting the selection for display on the second display device. Additionally, or alternatively, the method may include receiving text of a custom message to be transmitted from the first display device to the second display device. The text of the custom message may, for example, by typed in by a user.

The method may further include displaying a menu of the SNS on the first display device, wherein the SNS menu is displayed simultaneously with a home screen of the first display device. Also, the method may include automatically displaying a link to the web page with the message before the message is transmitted for display on the second display device.

In addition, the method may include displaying information indicative of different SNSs and receiving a signal selecting one of the SNSs, wherein these operations may be performed before the message is transmitted.

In accordance with another embodiment, a controller is provided which comprises an interface coupled to provider of a network-related service; and a processor to: control display of content on a screen of a first display device, receive a signal to share information, and generate a message to include information corresponding to the displayed content, wherein the message is generated in response to the signal to share information with a second display device and wherein the first and second display devices have access to the network-related service.

The controller may be coupled to the first display device, or the first display device may include the controller. Also, different circuits or chips or software code sections perform at least two of the operations of the processor. Also, the first and second display devices may be televisions, computer monitors, or handheld mobile devices such as pods, smart phones, or other data terminals.

The content may be derived from at least one of a broadcast signal, a web page, a game, or a media provider, and the network-related service may be a social network service (SNS), with the first and second display devices having access to the SNS based on membership information.

Also, the information corresponding to the displayed content in the message may be automatically obtained from an electronic program guide.

Also, the screen display may display a list of predetermined words or phrases, and the processor may receive a selection of one of the predetermined words or phrases to be included as or in the message. The screen may also automatically display a link to the web page with the message before the message is transmitted through the interface.

The suffixes "module" and "unit" as used herein are merely used for the purpose of simplifying the description. Therefore, the suffixes "module" and "unit" may also be alternately used for the reference of a specific element.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of one embodiment may be combined with the features of one or more other embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

We claim:

1. A method for controlling display of information, comprising:
    displaying a broadcasting program on a first display device;
    receiving a signal to share information;
    displaying a menu of a plurality of social network service (SNS) on the first display device simultaneously with the displaying of the broadcasting program;
    selecting a SNS from the displayed menu of the plurality of SNS;
    displaying a list of predetermined words or phrases;
    generating a message including information corresponding to the displayed broadcasting program, the message being automatically generated at the first display device in response to the received signal, and the information corresponding to the displayed broadcasting program in the message is automatically obtained from an electronic program guide, wherein the message further includes information of the selected predetermined words or phrases; and transmitting the message from the first display device to a second display device, wherein at least one of the first display device or the second display device is a television, wherein the message is transmitted to a provider of the selected SNS, and wherein the first display device and the second display device have access to the selected SNS.

2. The method of claim 1, further comprising:

automatically displaying a link to a web page with the message before the message is transmitted for display on the second display device.

3. A controller comprising:

an interface coupled to a provider of a Social Network Service (SNS); and a processor to:

a) control display of a broadcasting program on a screen of a first display device, b) receive a signal to share information, c) control display of a menu of a plurality of SNS;

d) receive an input to select a SNS from the displayed menu of the plurality of SNS;

e) control display of a list of predetermined words or phrases;

receive a selection of one of the predetermined words or phrases;

g) generate a message, at the first display device, to include information corresponding to the displayed broadcasting program, wherein the message is generated at the first display device in response to the signal to share information with a second display device, and the message includes information of the selected predetermined words or phrases, the information corresponding to the displayed broadcasting program in the message is automatically obtained from an electronic program guide, and wherein the first display device and the second display device have access to the selected SNS; and h) transmitting the message from the first display device to the second display device.

4. The controller of claim 3, wherein the controller is coupled to the first display device.

5. The controller of claim 3, wherein the first display device includes the controller.

6. The controller of claim 3, wherein the first and second display devices are televisions.

7. The controller of claim 3, wherein the screen automatically displays a link to a web page with the message before the message is transmitted through the interface.

* * * * *